(12) United States Patent
McAfee et al.

(10) Patent No.: US 11,299,379 B2
(45) Date of Patent: Apr. 12, 2022

(54) NET WRAP LIFTING DEVICE

(71) Applicant: DEERE & COMPANY, Moline, IL (US)

(72) Inventors: Joshua R. McAfee, Bloomfield, IA (US); Austin J. Jones, Ottumwa, IA (US); Timothy J. Kraus, Blakesburg, IA (US); Phani Anaparti, Siripuram (IN); Subhadra Maithili, Jangareddygudem (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/142,541

(22) Filed: Jan. 6, 2021

(65) Prior Publication Data

US 2021/0147200 A1 May 20, 2021

Related U.S. Application Data

(60) Division of application No. 16/431,924, filed on Jun. 5, 2019, now Pat. No. 10,934,143, which is a continuation-in-part of application No. 16/034,922, filed on Jul. 13, 2018, now Pat. No. 10,820,527.

(51) Int. Cl.
*A01F 15/00* (2006.01)
*B66D 1/60* (2006.01)
*A01F 15/07* (2006.01)
*B65B 27/12* (2006.01)
(Continued)

(52) U.S. Cl.
CPC .............. *B66D 1/60* (2013.01); *A01F 15/071* (2013.01); *B65B 27/125* (2013.01); *B65B 41/12* (2013.01); *B66D 3/20* (2013.01)

(58) Field of Classification Search
CPC ....... B66C 23/02; B66C 23/04; B66C 23/005; B66C 23/027; B66C 23/44; A01F 15/071; A01F 15/0715; A01F 2015/0745; A01F 2015/076
See application file for complete search history.

(56) References Cited

U.S. PATENT DOCUMENTS

| 3,176,861 A | 4/1965 | Paul et al. |
| 3,182,826 A | 5/1965 | Mutto |

(Continued)

FOREIGN PATENT DOCUMENTS

| CA | 2014088 A1 | 12/1990 |
| DE | 102010002730 A1 | 9/2011 |

(Continued)

*Primary Examiner* — Chelsea E Stinson

(57) ABSTRACT

A baler includes a body, and a wrap system that is attached to the body. The wrap system is operable to support a roll of wrap material in an installed position. A cover is attached to the body, and is moveable between an open position and a closed position. When in open position, the cover provides access to the wrap system from an exterior location. When in the closed position, the cover encloses the wrap system from the exterior location. The baler includes a lift system attached to the body. The lift system is concealed between the body and the cover when the cover is disposed in the closed position. The lift system is positioned below the cover when the cover is disposed in the open position. The lift system raises the roll of wrap material into the installed position.

17 Claims, 18 Drawing Sheets

(51) Int. Cl.
*B65B 41/12* (2006.01)
*B66D 3/20* (2006.01)

(56) References Cited

U.S. PATENT DOCUMENTS

| | | | |
|---|---|---|---|
| 3,578,179 A * | 5/1971 | Fujioka | B66C 23/44 |
| | | | 212/180 |
| 4,362,001 A | 12/1982 | Cockerham, Jr. et al. | |
| 4,569,439 A | 2/1986 | Freye et al. | |
| 4,691,503 A | 9/1987 | Frerich | |
| 4,697,402 A | 10/1987 | Anstey et al. | |
| 4,941,311 A | 7/1990 | Ardueser et al. | |
| 5,156,517 A | 10/1992 | Boissonneault | |
| 5,181,368 A | 1/1993 | Anstey et al. | |
| 5,189,866 A | 3/1993 | Krutza | |
| 5,348,439 A | 9/1994 | Kuhn, Jr. | |
| 5,561,971 A | 10/1996 | Sampson | |
| 5,974,764 A | 11/1999 | Anstey et al. | |
| 5,979,141 A | 11/1999 | Phillips | |
| 5,996,307 A | 12/1999 | Niemerg et al. | |
| 6,152,675 A | 11/2000 | Compton | |
| 6,267,422 B1 | 7/2001 | Alba | |
| 6,272,816 B1 | 8/2001 | Viaud et al. | |
| 6,499,610 B2 | 12/2002 | Spitsbergen | |
| 7,082,740 B2 | 8/2006 | Van der Lely | |
| 7,237,372 B2 | 7/2007 | Chapon et al. | |
| 7,334,776 B2 | 2/2008 | Kazerooni | |
| 7,430,959 B2 | 10/2008 | Routledge | |
| 7,878,347 B2 | 2/2011 | Alday | |
| 7,900,427 B2 | 3/2011 | Chapon et al. | |
| 7,946,095 B2 | 5/2011 | Olander | |
| 8,479,933 B2 | 7/2013 | Vaquera | |
| 8,919,085 B2 | 12/2014 | Smith et al. | |
| 8,925,287 B2 | 1/2015 | Derscheid | |
| 9,016,032 B2 | 4/2015 | Chapon et al. | |
| 9,320,199 B2 | 4/2016 | Smith et al. | |
| 2002/0066710 A1 * | 6/2002 | Spitsbergen | B66C 23/44 |
| | | | 212/179 |
| 2008/0121119 A1 * | 5/2008 | Routledge | A01F 15/0715 |
| | | | 100/5 |
| 2010/0236427 A1 | 9/2010 | Derscheid | |
| 2015/0373914 A1 | 12/2015 | Roberge | |
| 2016/0353664 A1 | 12/2016 | Weber et al. | |
| 2016/0355292 A1 | 12/2016 | Wigdahl et al. | |
| 2017/0332556 A1 | 11/2017 | Underhill | |
| 2019/0166769 A1 | 6/2019 | Little et al. | |

FOREIGN PATENT DOCUMENTS

| | | |
|---|---|---|
| EP | 1099367 A1 | 5/2001 |
| EP | 1129611 A2 | 9/2001 |
| EP | 1602269 A1 | 12/2005 |
| EP | 3566569 A2 | 11/2019 |

* cited by examiner

NET WRAP LIFTING DEVICE

RELATED APPLICATIONS

This application is a divisional patent application of U.S. patent application Ser. No. 16/431,924, filed Jun. 5, 2019, which is a continuation-in-part application of U.S. patent application Ser. No. 16/034,922, filed Jul. 13, 2018, the disclosures of which are hereby incorporated by reference in their entirety.

FIELD OF THE DISCLOSURE

The present disclosure generally relates to a baler for accumulating cut crop material and forming the crop material into a round bale.

BACKGROUND OF THE DISCLOSURE

Round balers accumulate cut crop material, and form the crop material into a round bale within a bale forming chamber. Once the bale is formed, the bale must be restrained or bound to maintain is form. Some round balers use a twine that is wound around a circumference of the round bale. Other round balers use a wrap material that is wrapped around the circumference of the round bale. The wrap material is provided in a roll of wrap material, and includes a length that is substantially equal to a height of the round bale. The roll of wrap material is loaded into a wrap system on the baler, and is fed into the bale forming chamber after the round bale has been formed, to wrap the round bale in the wrap material, thereby securing the shape and form of the round bale.

The installation position or elevation of the roll of wrap material in the wrap system may be positioned relatively high, and in some cases, may be above an operator's head. Because of the weight of the roll of wrap material, some operators have difficulty lifting the roll up to the installation elevation. Moreover, there is an industry desire to increase the size of the roll of wrap material so that the roll does not need to be changed as often. However, increasing the size of the roll of wrap material would likewise increase the weight of the roll, which would exacerbate the difficulty some operators have in lifting the roll of wrap material up to the installation elevation and into the wrap system.

SUMMARY OF THE DISCLOSURE

In one aspect, a baler for use with a netwrap roll is provided. The baler includes a frame supported on one or more wheels, a housing coupled to the frame and at least partially defining a baling chamber therein, a netwrap assembly having a netwrap frame coupled to the housing and at least partially defining a netwrap chamber, and a loading device at least partially positioned within the netwrap chamber. The loading device includes a first frame fixed relative to the netwrap frame, a second frame movable relative to the first frame between a frame stowed position and a frame deployed position, a carriage movable relative to the second frame between a carriage stowed position and a carriage deployed position, and wherein the carriage is configured to support the netwrap roll.

In another aspect, a baler for use with a netwrap roll is provided. The baler includes a frame supported on one or more wheels, a housing coupled to the frame and at least partially defining a baling chamber therein, a netwrap cover movable with respect to the housing and at least partially defining a netwrap chamber therein, wherein the netwrap cover is movable relative to the housing between a closed position, in which the netwrap chamber is not accessible from the outside, and an open position, in which the netwrap chamber is accessible from the outside, a loading device with a carriage movable with respect to the housing between a stowed position, in which the carriage is completely positioned within the netwrap chamber, and a deployed position, in which at least a portion of the carriage is positioned outside the netwrap chamber, and where the carriage is configured to support at least one netwrap roll.

According to an aspect of the present disclosure, a baler for accumulating cut crop material and forming the crop material into a round bale is provided. The baler includes a body, and a wrap system that is attached to the body. The wrap system is operable to support a roll of wrap material in an installed position. The wrap system is configured for wrapping the wrap material around a formed bale in the baler. A cover is attached to the body. The cover is moveable between an open position and a closed position. When the cover is disposed in the open position, the cover provides access to the wrap system from an exterior location. When the cover is disposed in the closed position, the cover encloses the wrap system from the exterior location. The baler includes a lift system, which is attached to one of the body and the cover. The lift system is concealed between the body and the cover when the cover is disposed in the closed position. The lift system is operable to raise the roll of wrap material, relative to the body, into the installed position.

In one embodiment of the baler, the lift system is positioned below the cover when the cover is disposed in the open position.

In one aspect of the disclosure, the lift system includes a lift location. The lift location is the location from which a vertical force is applied to one or more components of the baler in order to raise the roll of wrap material. The lift location is positionable at an elevation disposed above the installed position of the roll of wrap material when the cover is disposed in the open position.

In one aspect of the disclosure, the lift system may include a line actuator having a line. The line extends from the lift location downward for engagement with the roll of wrap material. The line actuator is operable to retract the line in order to raise the roll of wrap material. In one embodiment, the line actuator is an electrically driven winch that winds and un-winds the line. In another embodiment, the line actuator is a manually operated winch that winds and un-winds the line. It should be appreciated that the line actuator may include other devices not specifically mentioned or described herein. In one aspect of the disclosure, the line actuator is directly attached to the cover. In another aspect of the disclosure, the line actuator is directly attached to the body. In yet another aspect of the disclosure, the line actuator is directly attached to a jib arm, which is in turn attached to the body.

In one aspect of the disclosure, the lift system includes a cover support. The cover support interconnects the cover and the body when the cover is disposed in the open position. The cover support is operable to secure the cover relative to the body and prevent the cover from closing while raising the roll of wrap material.

In one aspect of the disclosure, the lift system includes a lift structure that is directly attached to the cover. The lift structure defines the lift location. The lift structure may include, but is not limited to, a pulley or other similar device capable of redirecting the path of the line. The line actuator may be attached to either the body or the cover, with the line extending around the lift structure and downward for engagement with the roll of wrap material.

In one aspect of the disclosure, the cover may include a cover structure, or framework. The cover structure supports the cover, and provides rigidity and strength for the cover. The cover support and the cover structure are operable to support the cover in the open position against a weight of the roll of wrap material, while raising the roll of wrap material, without permanent deformation to the cover.

In one aspect of the disclosure, the lift system may include a jib. The jib is rotatably attached to the body for rotation about a first vertical axis. The jib rotates about the first vertical axis, on a substantially horizontal plane, relative to a ground surface. The jib extends from the body to a distal end, with the distal end of the jib defining the lift location. As such, the distal end of the jib may include the lift structure, such as but not limited to a pulley.

In one aspect of the disclosure, the jib includes a first member and a second member. The first member is attached to the body for rotation about the first vertical axis on the substantially horizontal plane. The second member is rotatably attached to the first member for rotation about a second vertical axis. The first vertical axis and the second vertical axis are generally parallel with each other. The second member rotates about the second vertical axis on the substantially horizontal plane, such that the first member and the second member move on the same horizontal plane. The second member defines the distal end of the jib. In one aspect of the disclosure, the line actuator is attached to the jib. In one embodiment, the line actuator is attached to the second member of the jib.

In one aspect of the disclosure, the jib is moveable relative to the body between a stowed position and an operating position. When the jib is disposed in the stowed position, the jib is nestled against the body and out of interference with the cover, so that the cover may be positioned in the closed position. When the jib is disposed in the operating position, the jib extends away from the body to present the distal end of the jib, i.e., the lift location, in a position for raising the roll of wrap material into the installation position.

In one aspect of the disclosure, the jib is rotatably attached to the body for rotation about a horizontal axis for movement between a first elevated position and a second elevated position. The first elevated position may define the stowed position of the jib. For operation of the jib, the jib is rotated about the horizontal axis into the second horizontal position, after which the first member and the second member may be rotated bout the first vertical axis and the second vertical axis respectively to position the lift location at the distal end of the jib over the roll of wrap material.

The above and other features will become apparent from the following description and accompanying drawings.

BRIEF DESCRIPTION OF THE DRAWINGS

The detailed description of the drawings refers to the accompanying figures.

DETAILED DESCRIPTION OF THE DRAWINGS

Figure 1:
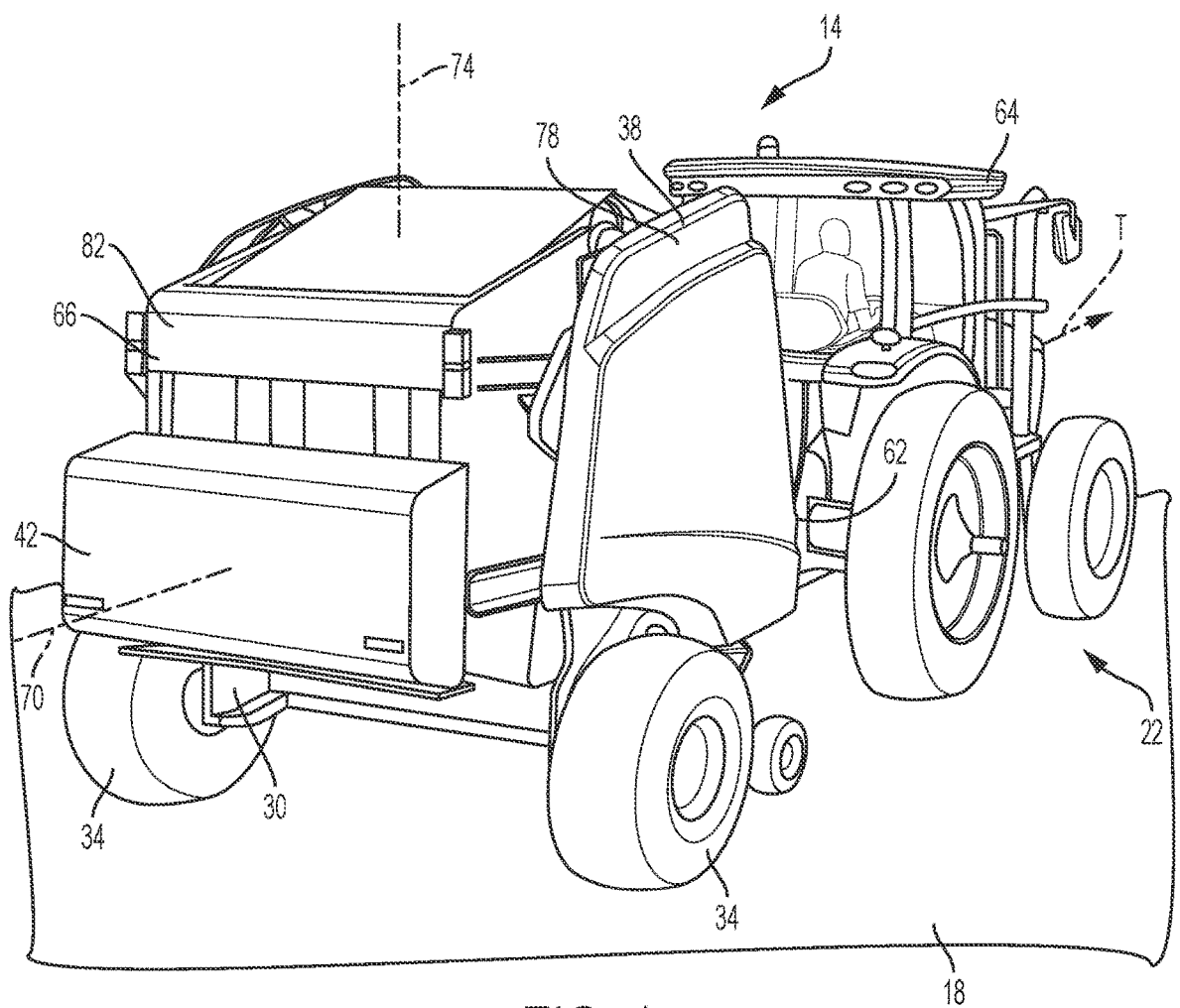
FIG. 1 is a rear perspective view of a baler mounted to a tow vehicle.

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

Those having ordinary skill in the art will recognize that terms such as "above," "below," "upward," "downward," "top," "bottom," etc., are used descriptively for the figures, and do not represent limitations on the scope of the disclosure, as defined by the appended claims.

Referring to FIGS. 1 and 3-11, a netwrap roll loading device 10 for use with a baler 14 having a netwrap assembly 42. The baler 14 is configured to collect crop material 18 from a support surface 22 (i.e., the field), process the crop material 18 into individual finished bales (not shown), wrap the finished bales with netwrap material 26 provided by a separate netwrap roll 46, and eject the finished and wrapped bales from the baler 14. In the illustrated implementation, the baler 14 includes a frame 30, a set of wheels 34 mounted on the frame 30, a housing 38 coupled to the frame 30, and the netwrap assembly 42 configured to store at least one netwrap roll 46 therein.

Figure 2:
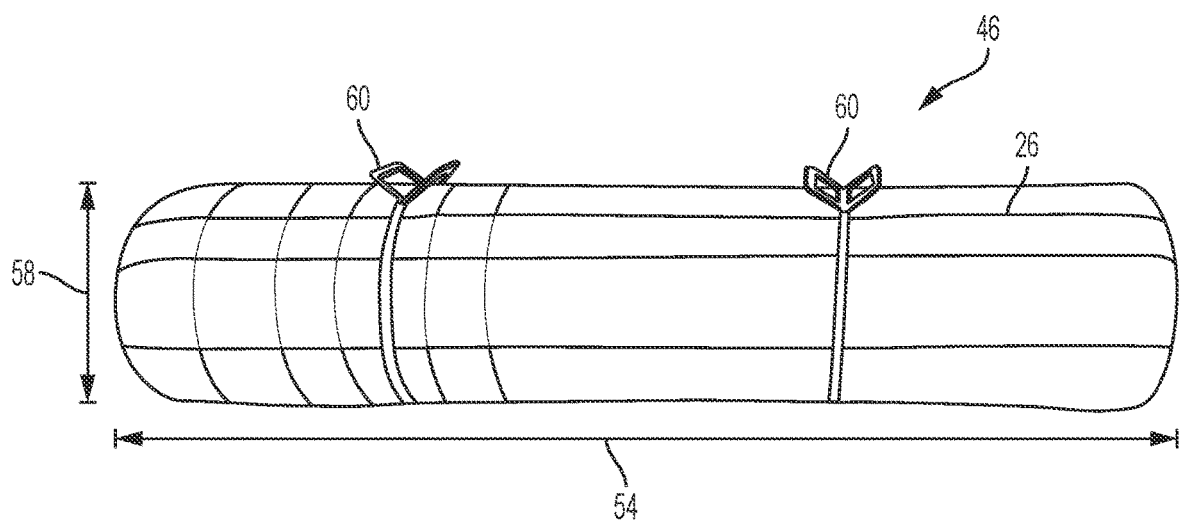
FIG. 2 is a front view of a netwrap roll.
Figure 3:
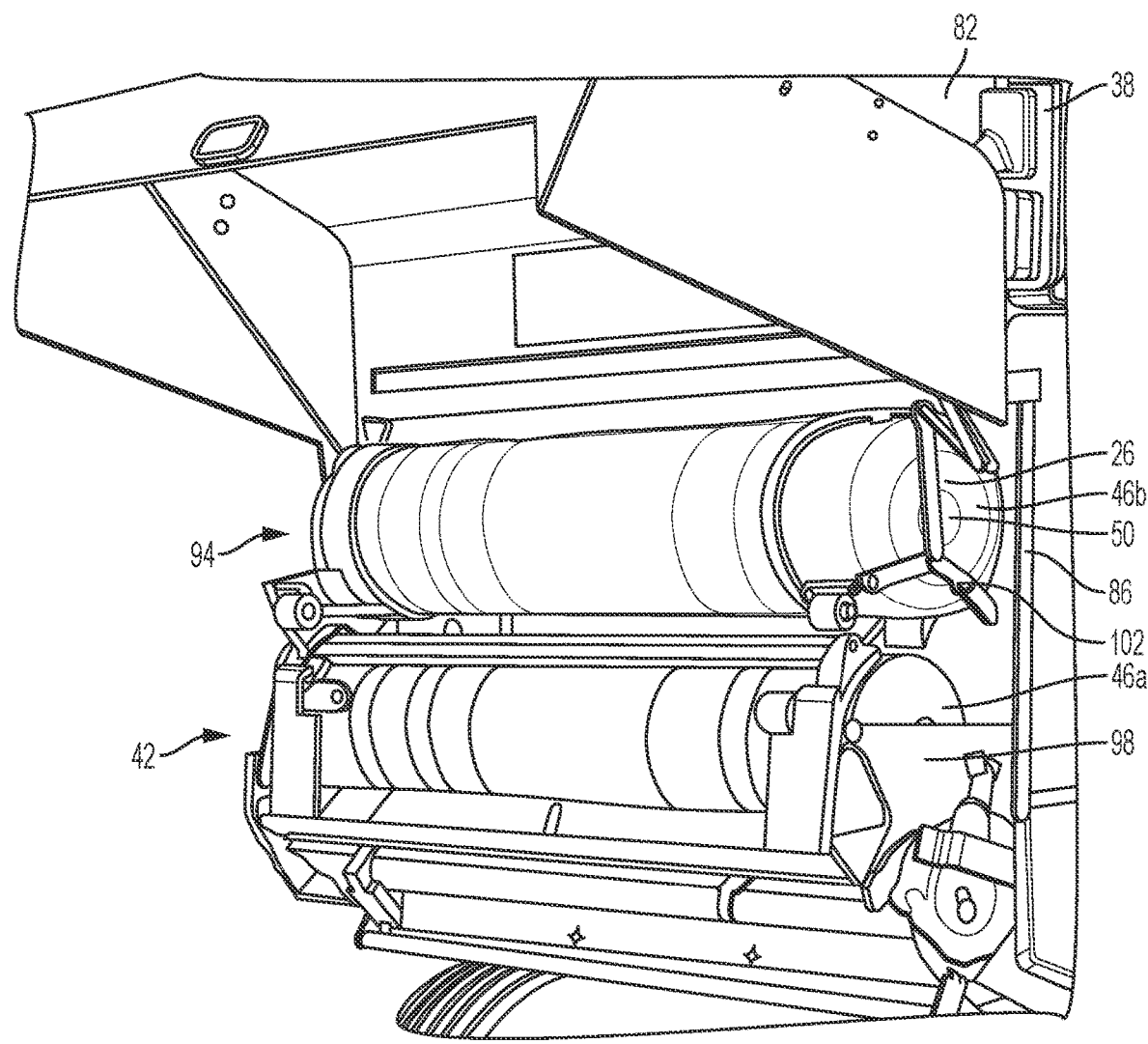
FIG. 3 is a rear perspective view of the baler of FIG. 1 with the netwrap door in the open position.

For the purposes of this application, each netwrap roll 46 includes a substantially cylindrical core 50 with a length of netwrap material 26 wrapped thereon. The netwrap roll 46 also defines an axial length 54 and an outer diameter 58. As shown in FIG. 2, the netwrap roll 46 may also include one or more removable handles 60 to aid the user when maneuvering the netwrap roll 46.

The frame 30 of the baler 14 is formed from one or more elongated members and includes a front end 62 generally in the form of a tow bar, and a rear end 66 opposite the front end 62. During use, the front end 62 of the frame 30 is connectable to a towing vehicle 64 such as an agricultural tractor and the like. The frame 30 of the baler 14 also defines a central axis 70 extending longitudinally therethrough and that is generally aligned with the direction of travel T of the baler 14 (see FIG. 1). The frame 30 also defines a vertical axis 74 oriented substantially perpendicular to the central axis 70 and substantially aligned with the force of gravity when the baler 14 is positioned on a substantially level surface.

The housing 38 of the baler 14 includes a forward covering 78 positioned proximate the front end 62 of the frame 30, and a rear door or crop package barrier 82 pivotably coupled to the forward covering 78 and positioned proximate the rear end 66 of the frame 30. Together, the forward covering 78 and rear door 82 at least partially define a baling chamber (not shown) configured to form a bale therein as is well known in the art. During use, the rear door 82 of the housing 38 is pivotable with respect to the forward covering 78 between a closed position (see FIG. 1), in which the rear door 82 encloses the baling chamber and restricts external access thereto, and an open position (not shown), in which the rear door 82 is pivoted away from the forward covering 78 allowing the baling chamber to be accessed from the outside. In the illustrated implementation, the rear door 82 is automatically pivotable relative to the forward covering 78 by a gate actuator (not shown) such as a hydraulic actuator, electrical actuator, and the like.

The baler 14 also includes a netwrap assembly 42 mounted to the housing 38 of the baler 14 and defining a netwrap chamber 94 therein. During use, the netwrap assembly 42 is configured to support at least one "primary" netwrap roll 46a within the netwrap chamber 94 whose netwrap material 26 is fed into the baling chamber for application onto a finished bale, and one or more "supplemental" netwrap rolls 46b within the netwrap chamber 94 for use after the primary netwrap roll 46 is depleted (see FIG. 3). In the illustrated implementation, the netwrap assembly 42 is configured to support one primary netwrap roll 46a and one supplemental netwrap roll 46b within the netwrap chamber 94.

Figure 4:
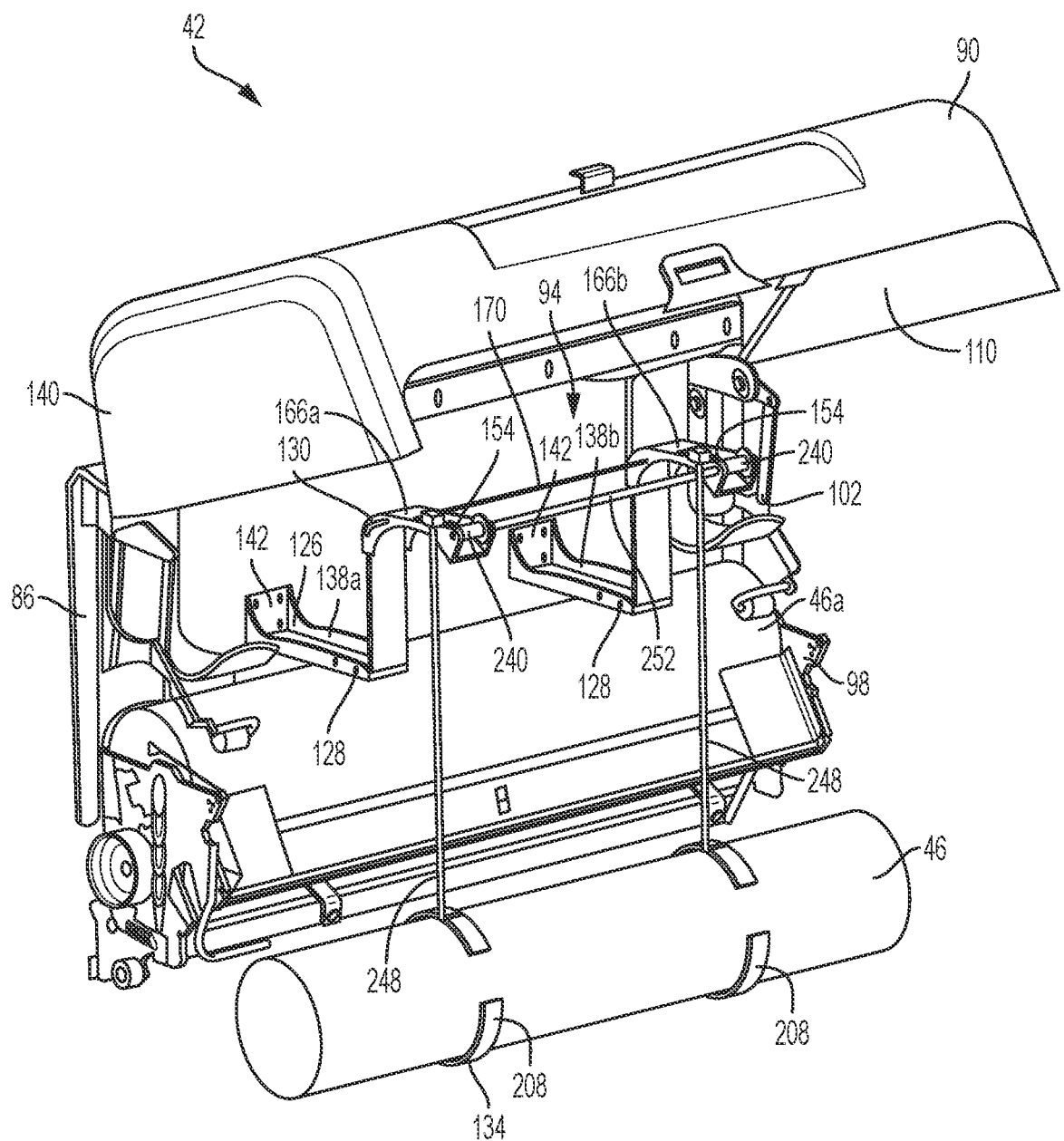
FIG. 4 is a perspective view of a netwrap assembly with the netwrap door in the open position and a loading assembly in the deployed position.

As shown in FIG. 4, the netwrap assembly 42 includes a netwrap frame 86 fixedly coupled to the housing 38, and a netwrap door 90 movably coupled to the netwrap frame 86 to at least partially define the netwrap chamber 94 therebetween. The netwrap assembly 42 also includes an operating assembly 98 at least partially positioned within the netwrap chamber 94, a storage assembly 102 at least partially positioned within the netwrap chamber 94, and the netwrap loading device 10. More specifically, the netwrap frame 86 is fixedly coupled to the rear door 82 of the housing 38 and defines a netwrap plane 100 that is substantially coincident therewith. In the illustrated implementation, the netwrap plane 100 has a substantially vertical orientation such that the netwrap plane 100 is substantially aligned with the direction of gravity G when the baler 14 is positioned on a generally level support surface 22 (see FIG. 6).

While the illustrated netwrap frame 86 is mounted to the rear door 66 of the housing 38, in alternative implementations the netwrap frame 86 may be mounted to any part of the baler 14 including, but not limited to, the forward covering 78, the frame 30, and the like. Still further, while the illustrated implementation includes a single netwrap assembly 42 that houses both the primary and supplemental netwrap rolls 46a, 46b, it is to be understood that the baler 14 may include multiple netwrap assemblies (not shown) configured to store and/or deploy netwrap rolls 46 as desired.

As shown in FIGS. 1 and 6-11, the netwrap door 90 of the netwrap assembly 42 is coupled to the netwrap frame 86 and movable with respect thereto between an open position (see FIG. 6), in which the netwrap chamber 94 is accessible from the outside, and a closed position (see FIG. 1), in which the netwrap chamber 94 is not accessible from the outside. For the purposes of this application, the netwrap chamber 94 is generally defined as the volume of space enclosed between the netwrap door 90 and netwrap frame 86 when the netwrap door 90 is in the closed position (see FIG. 6). In alternative implementations, the netwrap door 90 may be mounted directly to the housing 38 of the baler 14. In such implementations, the netwrap chamber 94 is generally defined as the volume of space enclosed between the netwrap door 90 and the housing 38.

In the illustrated implementation, the netwrap door 90 includes a substantially elongated body including an end wall 106, and a plurality of side walls 110 each extending from the end wall 106 to define an open end 114. Furthermore, the netwrap door 90 is pivotably coupled to the netwrap frame 86 such that the netwrap door 90 pivots between the open and closed positions. As such, when the netwrap door 90 is in the closed position (see FIG. 1), each of the plurality of side walls 110 is generally in contact with the netwrap frame 86 or housing 38 to enclose the netwrap chamber 94 therebetween. In contrast, when the netwrap door 90 is in the open position (see FIG. 6), the open end 114 of the door 90 is pivoted away from and out of engagement with the netwrap frame 86 and the housing 38. While the illustrated door 90 is pivotably coupled to the netwrap frame 86, it is to be understood that in alternative implementations that the door 90 may be linearly movable relative to the netwrap frame 86, include a series of connecting linkages, or even be completely removable therefrom.

Figure 6:
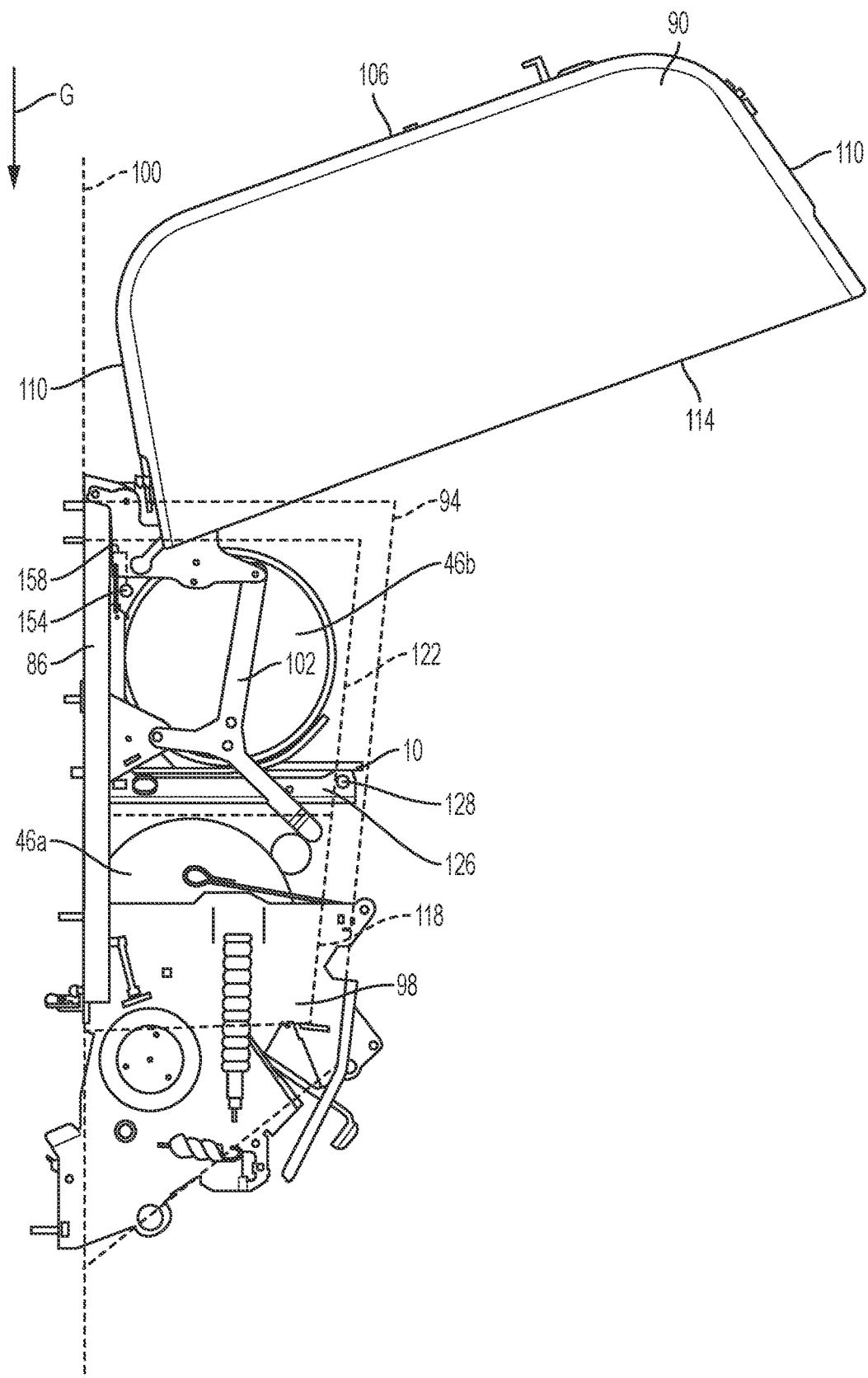
FIG. 6 is a side view of the netwrap assembly of FIG. 4 with the netwrap door in the open position and the loading assembly in the stowed position.

Illustrated in FIG. 6, the operating assembly 98 of the netwrap assembly 42 includes the associated machinery and linkages used to rotatably support the primary netwrap roll 46a within the netwrap chamber 94 and feed the netwrap material 26 located on the corresponding netwrap roll 46a into the baling chamber for application onto a finished bale as is well known in the art. The operating assembly 98 also defines an operating volume 118 generally defined as the volume of space occupied by a netwrap roll 46 when the roll 46 is being supported and manipulated by the operating assembly 98 (see FIG. 6).

Illustrated in FIG. 6, the storage assembly 102 of the netwrap assembly 42 includes the associated machinery and linkages used to support and store a supplemental netwrap roll 46b within the netwrap chamber 94 independent of the operating assembly 98. The storage assembly 102 also defines a storage volume 122 generally defined as the volume of space occupied by the supplemental netwrap roll 46b when stored by the storage assembly 102. In the illustrated implementation, at least a portion of the storage volume 122 of the storage assembly 102 is vertically aligned with the operating volume 118 of the operating assembly 98 such that an axis parallel with the vertical axis 74 can pass through both volumes 118, 122 simultaneously.

Referring to FIGS. 4-11, the loading assembly 10 of the netwrap assembly 42 includes a first frame 126 fixed relative to the netwrap frame 86, a second frame 130 pivotably coupled to the first frame 126, a carriage 134 movably coupled to the second frame 130, and a drive assembly 136 to maneuver the elements 126, 130, 134 of the loading assembly 10 with respect to one another. During use, the loading assembly 10 is configured to receive a netwrap roll 46 positioned outside the netwrap chamber 94 (e.g., positioned proximate the support surface 22; see FIG. 11) and convey the collected netwrap roll 46 into at least one of the storage volume 122 and the operating volume 118 of the netwrap assembly 42. More specifically, the loading assembly 10 is adjustable between a retracted position (see FIG. 6), in which the carriage 134 is positioned inside the netwrap chamber 94, and a deployed position (see FIGS. 8 and 11), in which the carriage 134 is positioned at least partially outside the netwrap chamber 94 and more accessible to the user. In the illustrated implementation, when the loading assembly 10 is in the retracted position, the carriage 134 is at least partially positioned within the storage volume 122 of the netwrap chamber 94.

While the illustrated loading assembly 10 is adjustable between a retracted position and a deployed position, it is to be understood that in alternative implementations the loading assembly 10 may include multiple deployed positions, each corresponding to a particular location to which the netwrap roll 46 is to be conveyed (e.g., proximate the support surface 22, the operating volume 118, the storage volume 122, and the like).

Figure 5:
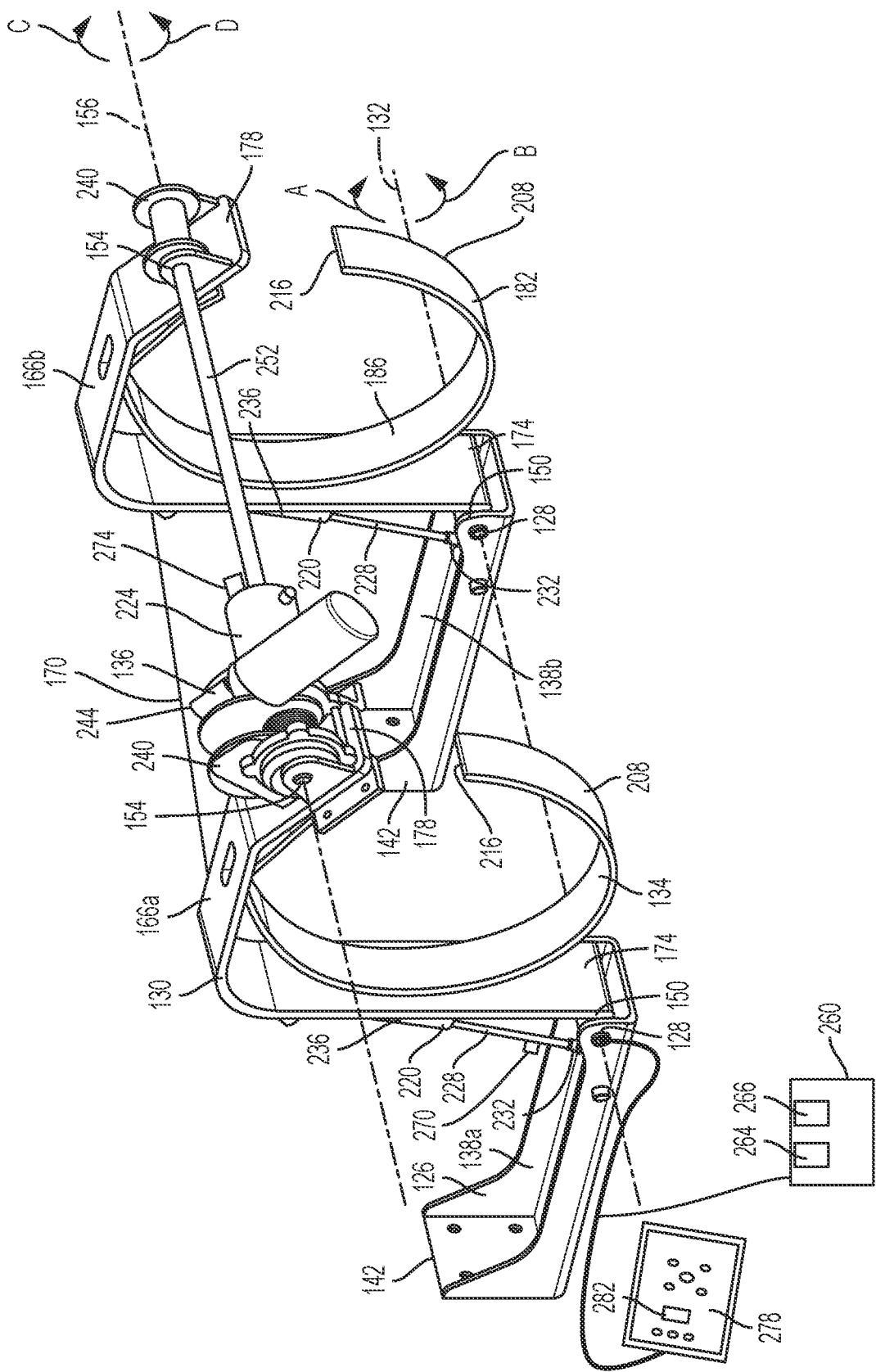
FIG. 5 is a perspective view of the loading assembly of FIG. 4.
Figure 7:
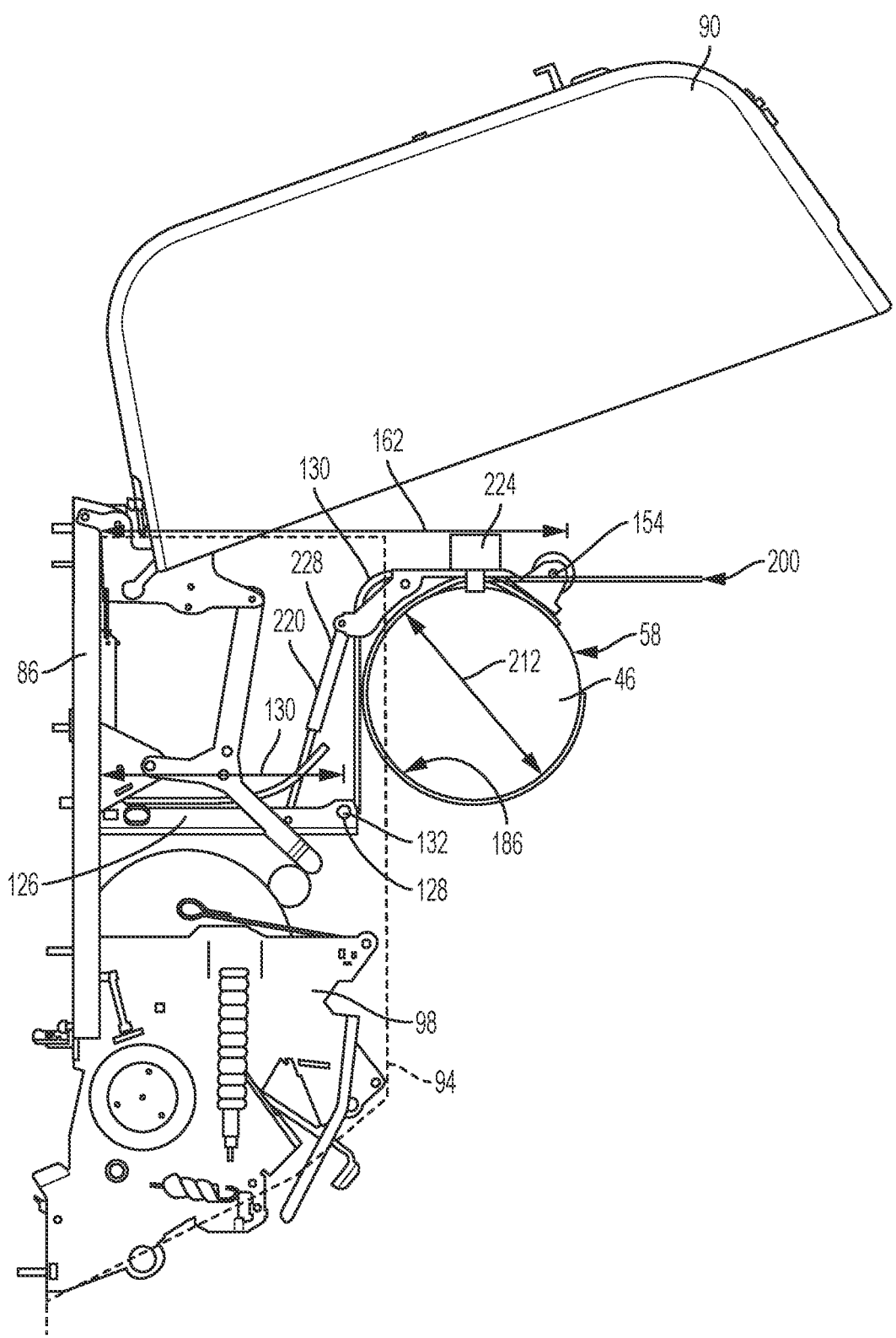
FIG. 7 is a side view of the netwrap assembly of FIG. 4 with the netwrap door in the open position and the second frame of the loading assembly in the deployed position.

Illustrated in FIGS. 4 and 5, the first frame 126 of the loading assembly 10 is fixed relative to the netwrap frame 86 and defines a pair of first mounting points 128 spaced a first mounting distance 130 from the netwrap plane 100 (see FIG. 7). Together, the first mounting points 126 of the first frame 126 define a first axis of rotation 132 that is substantially transverse to the central axis 70. In the illustrated implementation, the distance 130 between the netwrap frame 86 and the first mounting points 126 generally corresponds to at least one of the width of the storage volume 122 and the operating volume 118. As such, the first distance 130 is generally equal to or larger than the outer diameter 58 of a netwrap roll 46 intended to be stored therein.

The first frame 126 of the loading assembly 10 includes a pair of elongated members 138a, 138b each having a first end 142 fixedly coupled to the netwrap frame 86, and a second end 146 opposite the first end 142 that forms a corresponding one of the first mounting points 126. More specifically, each elongated member 138a, 138b of the first frame 126 extends outwardly (i.e., rearwardly) from the housing 38 of the baler 14 in a direction substantially parallel to the central axis 70.

The second frame 130 of the loading assembly 10 includes a pair of second mounting points 150, each pivotably coupled to a corresponding first mounting point 128 of the first frame 126. The second frame 130 also includes a pair of third mounting points 154, each spaced a distance from the second mounting points 150 and defining a second axis 156 that is substantially parallel to the first axis 132. During use, the second frame 130 is pivotable relative to the first frame 126 about the first axis 132 between a stowed position (see FIG. 6), in which the pair of third mounting points 154 (i.e., the second axis 156) are spaced a first distance 158 from the netwrap plane 100, and a deployed position (see FIG. 7), in which the pair of third mounting points 154 (i.e., the second axis 156) are spaced a second distance 162 from the netwrap plane 100 that is greater than the first distance 158. More specifically, when the second frame 130 is in the stowed position, the pair of third mounting points 154 are positioned axially between the pair of first mounting points 126 (i.e., the first axis 132) and the netwrap plane 100 (e.g., the first distance 158 is less than the first mounting distance 130). In contrast, the pair of third mounting points 154 are positioned axially further away from the netwrap frame 86 than the pair of first mounting points 126 when the second frame 130 is in the deployed position (e.g., the second distance 162 is greater than the first mounting distance 130).

Figure 11:
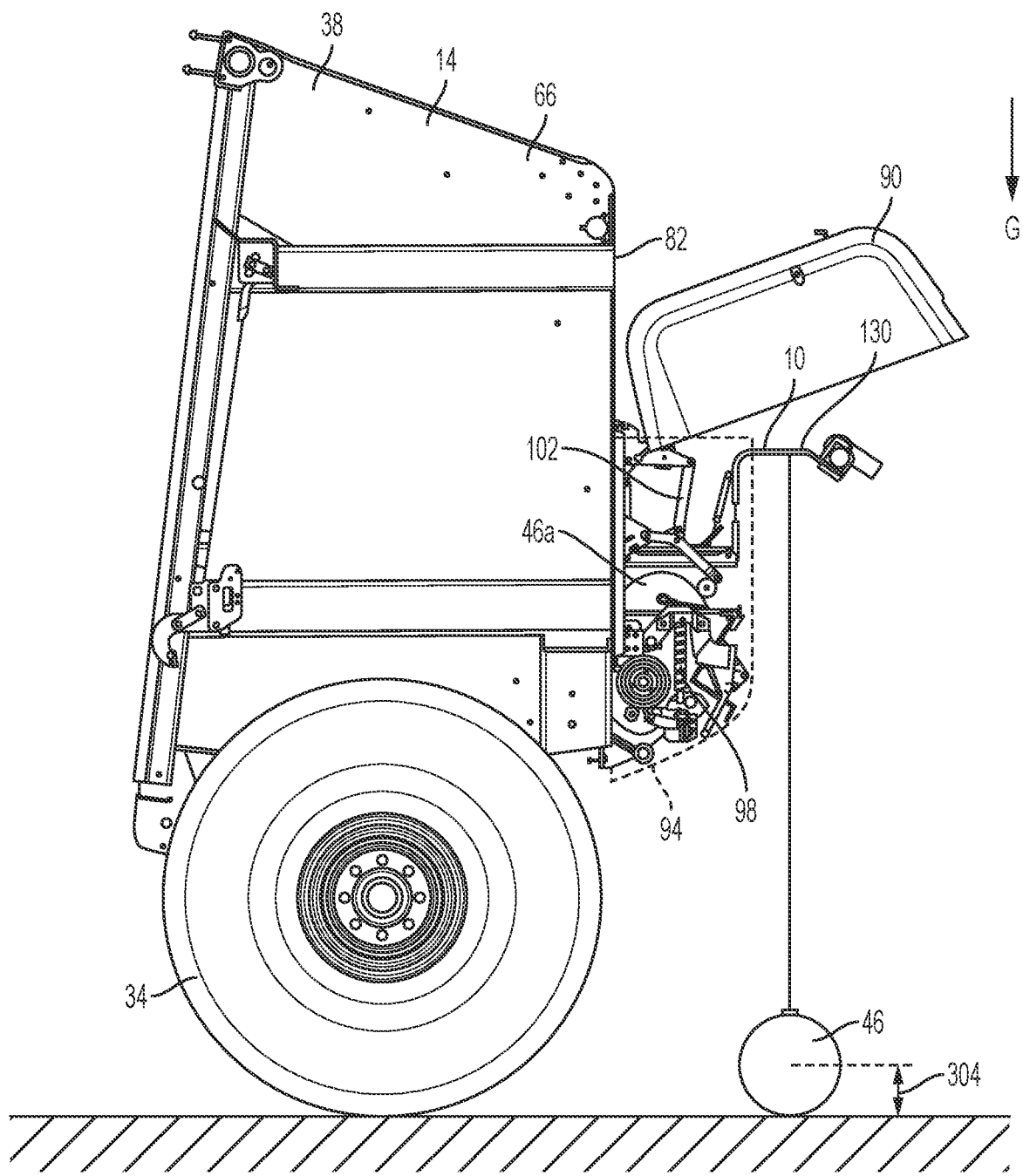
FIG. 11 is a side view of the baler of FIG. 9 with the loading assembly in one deployed position.

As shown in FIGS. 7 and 11, the second distance 162 of the second frame 130 is sufficiently large so that the pair of third mounting points 154 are clear of any obstructions positioned between the mounting points 154 and the support surface 22 in a generally vertical orientation (e.g., generally aligned with the vertical axis 74). While the illustrated implementation only includes the operating assembly 98 as a potential obstruction, in alternative implementations such obstructions may include, but are not limited to, a bale accumulator, a trailer, and the like. In such alternative implementations, the second distance 162 is sufficiently large to avoid any obstructions that would hamper the carriage ability to travel vertically between the support surface 22 and the second frame 130 when the second frame 130 is in the deployed position.

In the illustrated implementation, the second frame 130 of the loading assembly 10 includes a pair of support arms 166a, 166b and one or more cross-members 170 extending between and coupled to both support arms 166a, 166b causing the support arms 166a, 166b and cross-members 170 to move together as a unit. As shown in FIG. 5, each support arm 166a, 166b of the second frame 130 is substantially "L-shaped" having a first end 174 defining a corresponding one of the pair of second mounting points 150, and a second end 178 opposite the first end 174 defining a corresponding one of the pair of third mounting points 154. When assembled, the second mounting points 150 of each arm 166a, 166b are pivotably coupled to a corresponding first mounting point 126 of the first frame 126. As such, pivoting the second frame 130 about the resulting joint (e.g., about the first axis 132) causes the third mounting points 154 to travel in a substantially arcuate path between the stowed position and the deployed position.

Illustrated in FIG. 5, the carriage 134 of the loading assembly 10 includes a body 182 at least partially defining a storage position 186 that is sized and shaped to receive at least a portion of a netwrap roll 46 therein. During use, the carriage 134 of the loading assembly 10 is movable relative to the second frame 130 between a retracted position (see FIG. 7), in which the carriage 134 is a first distance 200 from the second axis 156, and an extended position (see FIG. 8), in which the carriage 134 is a second distance 204 from the second axis 156 that is greater than the first distance 200.

Figure 8:
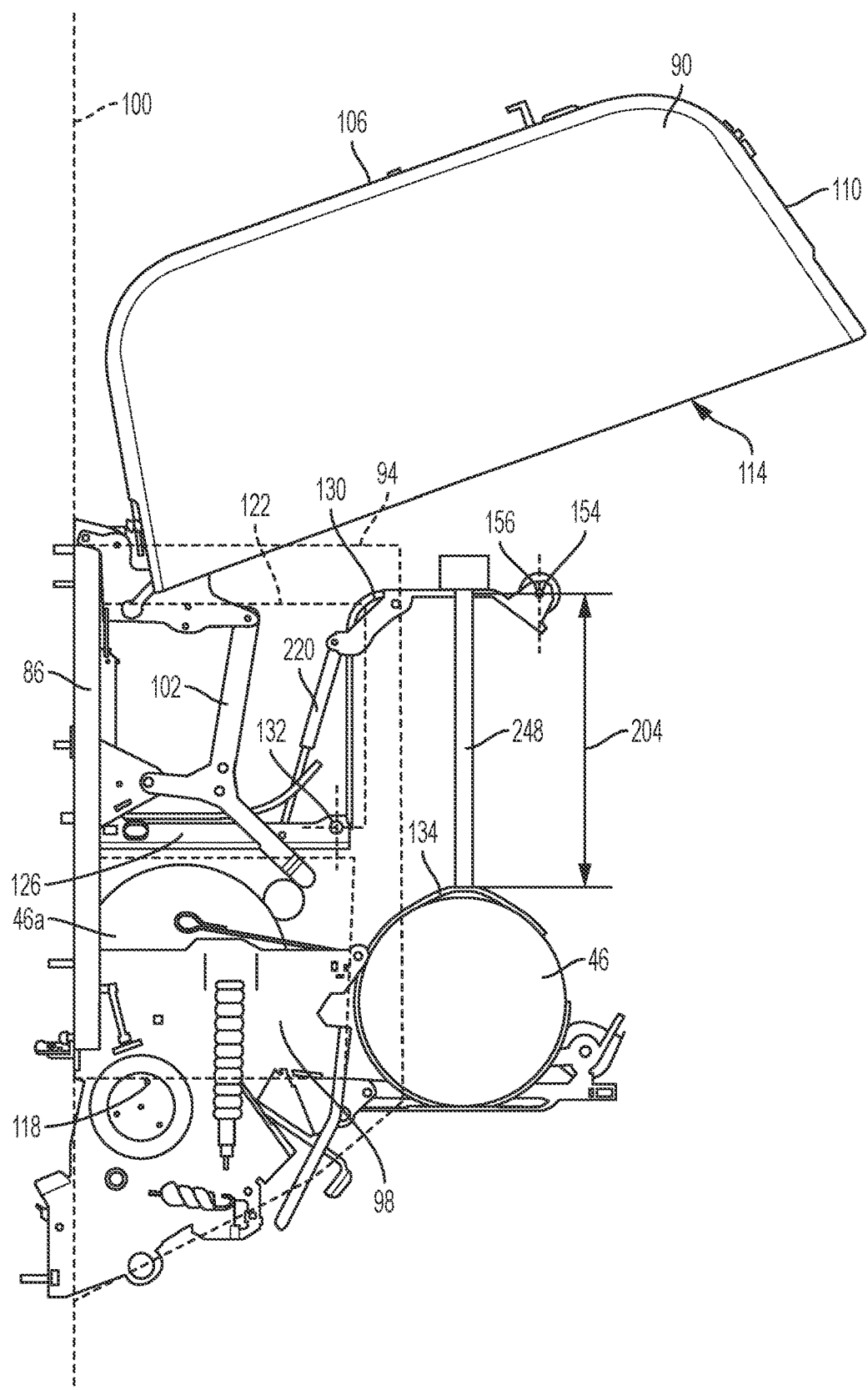
FIG. 8 is a side view of the netwrap assembly of FIG. 4 with the netwrap door in the open position and the loading assembly in the deployed position.
Figure 9:
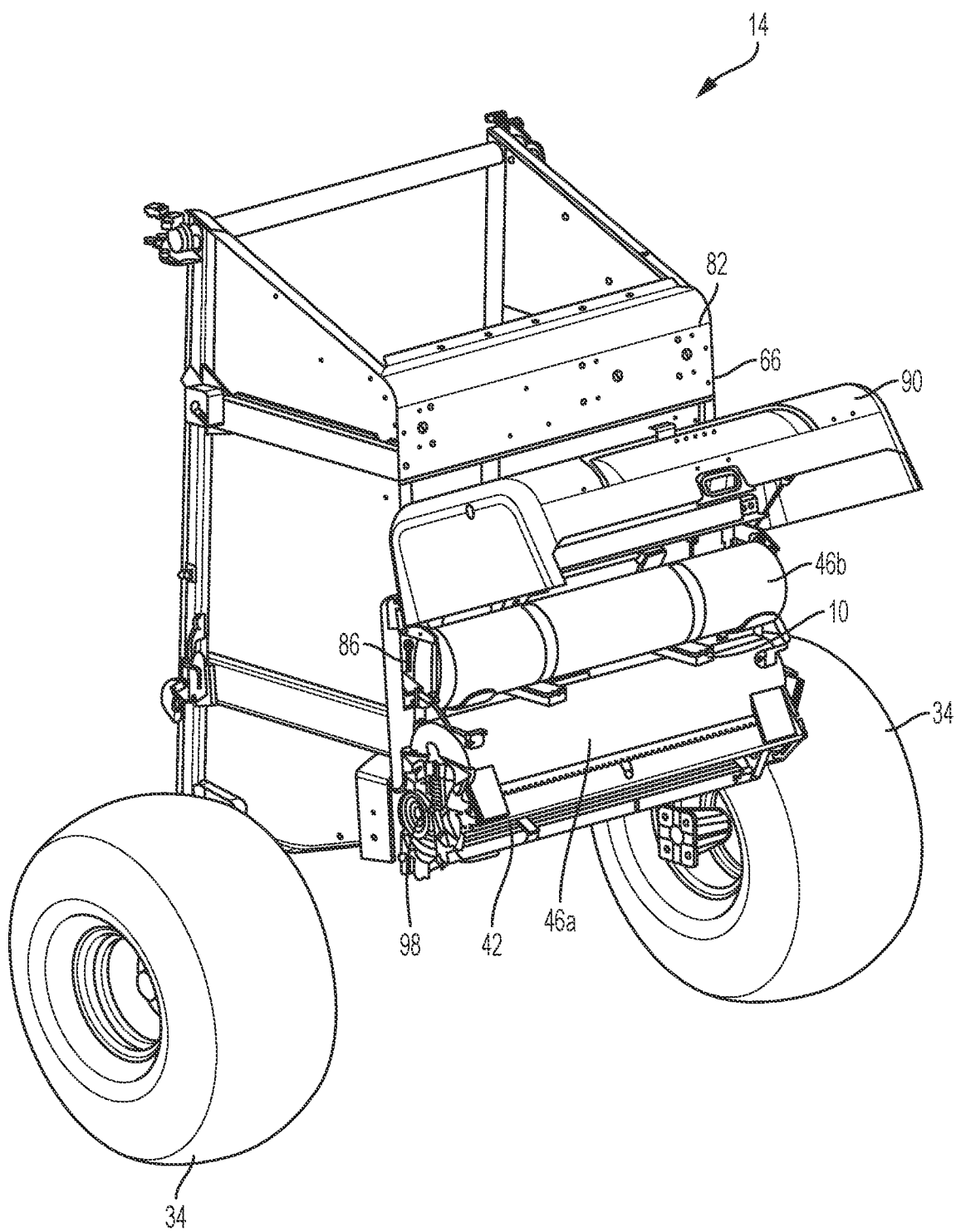
FIG. 9 is a perspective view of the netwrap assembly of FIG. 4 mounted to a baler.
Figure 10:
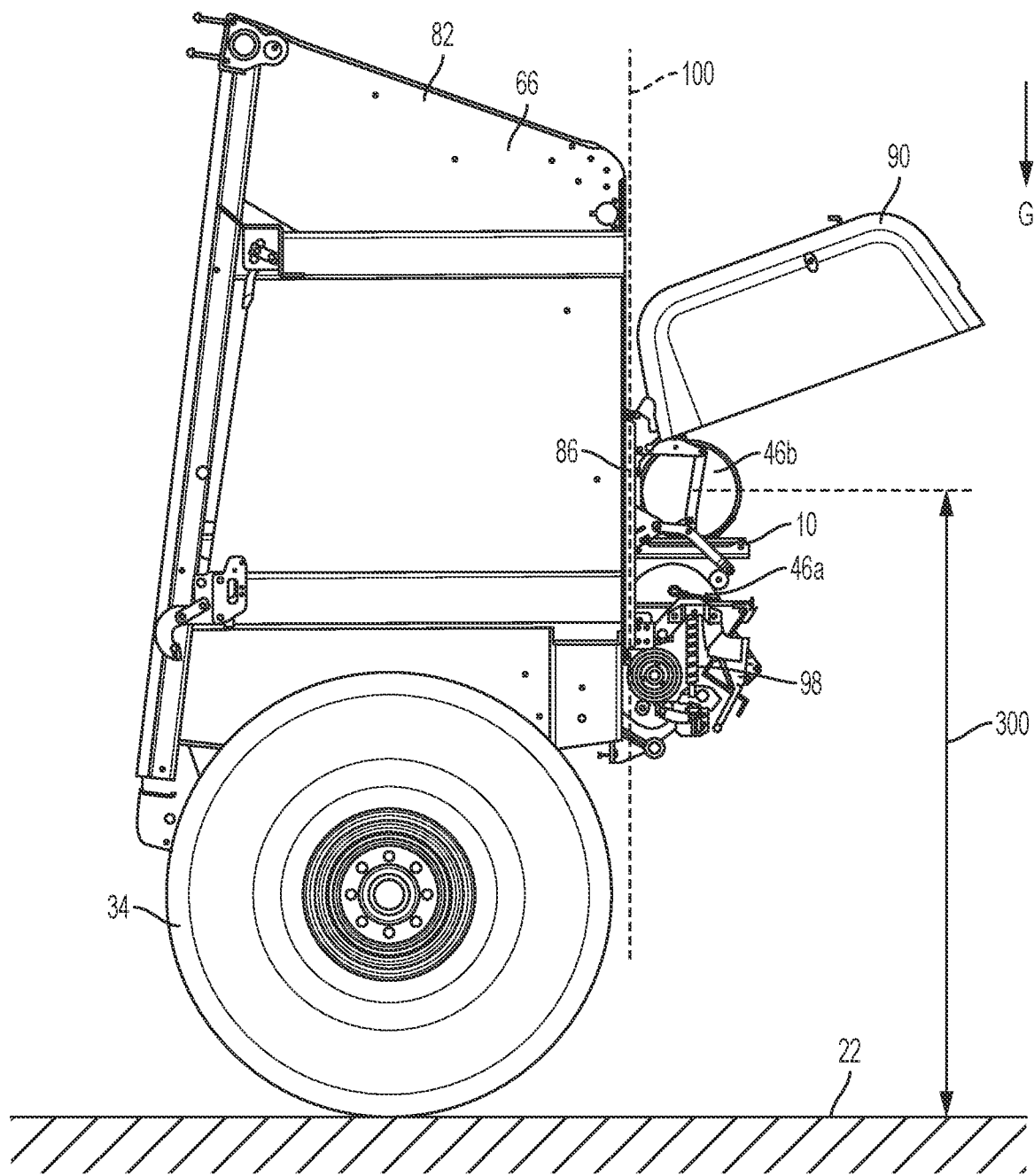
FIG. 10 is a side view of the baler of FIG. 9 with the loading assembly in the retracted position.

As shown in FIGS. 8 and 11, the carriage 134 is configured to move linearly with respect to the second frame 130 along a substantially vertical path between the stowed and deployed positions. As such, the carriage 134 is a first vertical distance 300 from the support surface 22 in the stowed position, and a second vertical distance 304 from the support surface 22 that is less than the first vertical distance 300 in the deployed position. While the illustrated implementation illustrates the deployed position of the carriage 134 proximate the support surface 22 (e.g., with a second vertical distance 304 close to zero), it is to be understood that the deployed position may be set to any vertical distance corresponding to the loading surface being used (e.g., aligned with a bench, a loading dock, a pallet, and the like). In still other implementations, the carriage 134 may have multiple deployed positions, each having a unique vertical height from the support surface 22.

In the illustrated implementation, the body 182 of the carriage 134 includes a plurality of support rings 208, each being substantially annular in shape and defining an inner diameter 212 that substantially corresponds to the outer diameter 58 of the netwrap rolls 46 (see FIGS. 5 and 7). During use, the user axially inserts a netwrap roll 46 into the storage position 186 of the carriage 134 by passing the netwrap roll 46 axially through each of the plurality of rings 208 (see FIG. 4). Once inserted, the netwrap roll 46 and carriage 134 move together as a unit.

As shown in FIG. 5, each ring 208 of the carriage 134 includes a gap 216 formed therein to allow the inner diameter 212 of the rings 208 to vary and compensate for changes in the netwrap roll's outer diameter 58. Still further, the gaps 216 are also sized and shaped to allow the handles 60 of the netwrap roll 46 to pass axially therethrough. As such, when a user inserts the netwrap roll 46 into the storage location 186, the user does not need to remove his hands from the handles 60 for the entire process. In alternative implementations, the carriage 134 may include alternative designs, shapes, or mechanisms to releasably support at least a portion of a netwrap roll 46 therein.

Illustrated in FIG. 5, the drive assembly 136 of the loading assembly 10 includes a first actuator assembly 220 in operable communication with and extending between the first frame 126 and the second frame 130, and a second actuator assembly 224 in operable communication with and extending between the second frame 130 and the carriage 134. Together, the first actuator assembly 220 and the second actuator assembly 224 are configured to actively adjust the loading assembly 10 between the stowed configuration and the deployed configuration.

The first actuator assembly 220 of the drive assembly 10 includes a plurality of actuators 228, each having a first end 232 and a second end 236 movable with respect to the first end 232 to define an actuator distance 230 therebetween. Once assembled, one of the first end 232 and the second end 236 of the actuators 228 are coupled to the first frame 126 while the other of the first end 232 and the second end 236 are coupled to the second frame 130. During use, adjusting the actuator distance 230 of the actuators 228 cause the second frame 130 to pivot relative to the first frame 126 about the first axis 132 (e.g., at the joint created between the first mounting points 128 and the second mounting points 150). More specifically, increasing the actuator distance 230 causes the second frame 130 to pivot toward the deployed position (e.g., in direction A) while reducing the actuator distance 230 causes the second frame 130 to pivot toward the stowed position (e.g., in direction B that is opposite to direction A). In the illustrated implementation, each actuator 228 of the first actuator assembly 220 includes a gas spring. However, in alternative implementations, alternative forms of actuation may be used including, but not limited to, a hydraulic cylinder, a gear train, an electric linear actuator, a pneumatic cylinder, biasing members, and the like.

The second actuator assembly 224 of the drive assembly 10 includes a pair of pulleys 240 each rotatably mounted to a respective one of the third mounting points 154 of the second frame 130, a drive motor 244 in operable communication with and configured to drive the pulleys 240, and a pair of cables 248 each extending between and coupled to a respective pulley 240 and the carriage 134. During use, rotating the pulleys 240 about the second axis 156 causes the carriage 134 to move relative to the second frame 130 between the retracted position and the extended position (described above). More specifically, rotating the pulleys 240 in a first direction C causes the corresponding cables 248 to coil onto the pulleys 240 and shorten the uncoiled length thereof. As such, rotating the pulleys 240 in a first direction C causes the carriage 134 to move toward the second frame 130 and the stowed position. In contrast, rotating the pulleys 240 in a second direction D, opposite the first direction C, causes the corresponding cables 248 to uncoil and increase the uncoiled length thereof. As such, rotating the pulleys 240 in the second direction D causes the carriage 134 to move away from the second frame 130 and toward the extended position. In the illustrated implementation, the both pulleys 240 are mounted onto a common shaft 252 such that both pulleys 240 rotate together as a unit. This configuration allows the cables 248 to be wound and unwound from the pulleys 240 together assuring the orientation of the carriage 134 relative to the second axis 156 remains constant.

Illustrated in FIG. 5, the loading assembly 10 also includes a controller 260 configured to direct and control the operation of the loading assembly 10 during use. The controller 260 includes a processor 264, a memory unit 266 in operable communication with the processor 264, and one or more sensors 270, 274 sending and receiving signals from the processor 264. The processor 264 is also in operable communication with one or more elements of the baler 14 such as, but not limited to, the first actuator assembly 220, the second actuator assembly 224, and a user interface 278. During use, the controller 260 receives one or more signals from the user interface 278 and the one or more sensors 270, 274, inputs the received information into one or more control algorithms, and outputs signals to the first actuation assembly 220 and the second actuation assembly 224 to control the movement of the carrier 134 relative to the baler housing 38. More specifically, the processor 264 of the controller 260 is configured to send signals to the first actuation assembly 220 and the second actuation assembly 224 to adjust the loading device 10 between the stowed configuration (see FIGS. 6 and 9) and the deployed configuration (see FIGS. 8 and 11).

The one or more sensors 270, 274 of the controller 260 are positioned throughout the baler 14 and configured to provide information regarding the operation and status of the loading device 10. In particular, the controller 260 includes a first position sensor 270 configured to detect the relative position of the second frame 130 with respect to the first frame 126, and a second position sensor 274 configured to detect the relative position of the carriage 134 with respect to the second frame 130. The sensors 270, 274 may be present individually, in plurality, or in combination.

The user interface 278 of the controller 260 is configured to provide and receive information from the user. As shown in FIG. 5, the user interface 278 includes a remote unit in operable communication with the processor 264 and having one or more screens 282 to provide information to the user, and one or more inputs (e.g., buttons, touchscreens, and the like) to receive inputs and data from the user. In alternative implementations, the user interface 278 may be integrated into the cab of the towing vehicle 64 or fixedly mounted to the housing 38 of the baler 14.

During baling operations, the netwrap assembly 42 is typically stored with the loading assembly 10 in the stowed configuration and the netwrap door 90 in the closed position (see FIG. 1).

To load a netwrap roll 46 into the netwrap assembly 42, the user pivots the netwrap door 90 from the closed position (see FIG. 1) into the open position (see FIG. 3) to allow exterior access to the netwrap chamber 94. In implementations where a powered netwrap door 90 is present (e.g., an actuator is used), the user may command the netwrap door 90 to open by entering the necessary inputs into the user interface 278. In manually operated implementations, the user may manually pivot the netwrap door 90 between the open and closed positions.

With the netwrap door 90 in the open position, the user may then instruct the loading assembly 10 to move to the deployed configuration. To do so, the user enters the necessary inputs into the user interface 278 instructing the processor 264 to begin the deployment process. With the process initiated, the processor 264 sends signals to the first actuator assembly 220 instructing both actuators 228 to increase in length. As the actuator lengths 230 increase, the second frame 130 pivots about the first axis 132 relative to the first frame 126 in the first direction A and toward the deployed position. Simultaneously, the first position sensor 270 sends a continuous stream of signals to the processor 264 representative of the current angular position of the second frame 130.

Once the second frame 130 reaches the deployed position (see FIG. 7), the processor 264 receives a corresponding signal from the first position sensor 270 representing the frame's position. The processor 264 then processes the signal and instructs the actuators 228 to stop, maintaining the second frame 130 in the deployed position.

With the second frame 130 in the upright position, the processor 264 then outputs signals to the second actuator assembly 224 instructing the drive motor 244 to rotate the pulleys 240 in the second direction D. As described above, rotating the pulleys 240 in the second direction D causes the cables 248 are unwind therefrom increasing the cable's unwound length. This action, in turn, increases the distance between the carriage 134 and the second frame 130 and causes the vertical height of the carriage 134 to decrease. Simultaneously, the second position sensor 274 sends a continuous stream of signals to the processor 264 representative of the current distance between the second frame 130 and the carriage 134.

Once the carriage 134 reaches the deployed position, the processor 264 receives a corresponding signal from the second position sensor 274 representing the carriage's position. The processor 264 then processes the signal and instructs the drive motor 244 to stop, maintaining the carriage 134 in the deployed position and placing the loading assembly 10 in the deployed configuration overall. In some implementations, the user may then adjust the position of the carriage 134 (e.g., increasing or decreasing its vertical height 300) by entering the necessary inputs into the user interface 278.

With the loading assembly 10 in the deployed configuration, the user may then load a netwrap roll 46 into the storage position 186 of the carriage 134. To do so, the user axially passes the roll 46 through each of the rings 208 of the carriage 134. Due to the carriage's relatively low position proximate the support surface 22, the user can load the netwrap roll 46 into the carriage 134 with minimal stress and effort.

Once the netwrap roll 46 is loaded into the storage position 186 of the carriage 134, the user may then instruct the loading assembly 10 to return to the stowed configuration. To do so, the user enters the necessary inputs into the user interface 278 instructing the processor 264 to begin the stowing process. While the illustrate implementation indicates that the stowing process may be initiated by inputs from the user, in alternative implementations the stowing process may be initiated by other information including, but not limited to, the detection of a certain amount of weight in the carriage 134, the tension within the cables 248 exceed a predetermined amount, a certain period of time has passed, and the like.

With the process initiated, the processor 264 sends signals to the second actuator assembly 224 instructing the drive motor 244 to rotate the pulleys 240 in the first direction C. As described above, rotating the pulleys 240 in the first direction C causes the cables 248 to wind onto the pulleys 240 decreasing the cable's unwound length. This action, in turn, decreases the distance between the carriage 134 and the second frame 130 and causes the vertical height 300 of the carriage 134 to increase. Simultaneously, the second position sensor 274 sends a continuous stream of signals to the processor 264 representative of the current distance between the second frame 130 and the carriage 134.

Once the carriage 134 reaches the stowed position (see FIG. 7), the processor 264 receives a corresponding signal from the second position sensor 274 representing the carriage's position. The processor 264 then processes the signal and instructs the drive motor 244 to stop, maintaining the carriage 134 in the stowed position.

With the carriage 134 stowed, the processor 264 then outputs signals to the first actuator assembly 220 instructing both actuators 228 to decrease in length. As the actuator lengths 230 decrease, the second frame 130 pivots about the first axis 132 relative to the first frame 126 in the second direction B and toward the stowed position. Simultaneously, the first position sensor 270 sends a stream of continuous signals to the processor 264 representative of the current angular position of the second frame 130.

Once the second frame 130 reaches the stowed position (see FIGS. 6 and 9), the processor 264 receives a corresponding signal from the first position sensor 270 representing the frame's position. The processor 264 then processes the signal and instructs the actuators 228 to stop, maintaining the second frame 130 in the stowed position and placing the loading assembly 10 in the stowed configuration overall. As shown in FIG. 6, the stowed configuration of the illustrated implementation corresponds with placing the netwrap bale 46 in the storage volume 122 of the netwrap chamber 94. However, in alternative implementations, the loading assembly 10 may be configured to position the netwrap bale 46 in the processing volume 118. In still other implementations, the user may be able to elect on the user interface 278 where the netwrap roll 46 is stored.

With the netwrap roll 46 stored and the loading assembly 10 in the stowed configuration, the user may then pivotably return the netwrap door 90 to the closed position and resume baling operations.

Figure 12:
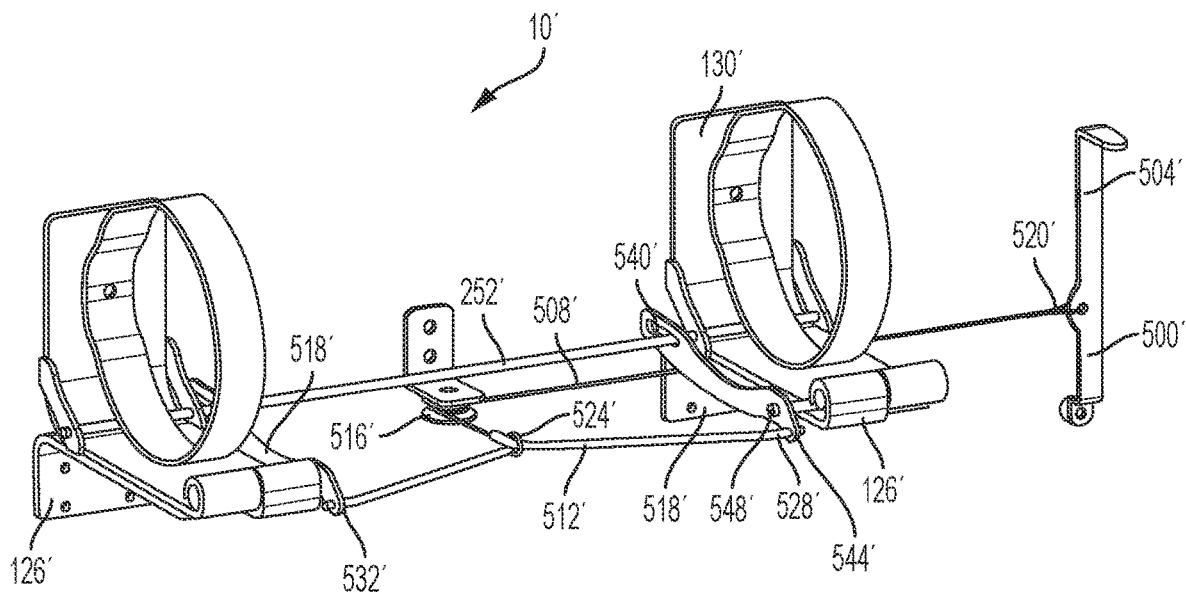
FIG. 12 is a perspective view of another implementation of a loading assembly.
Figure 13:
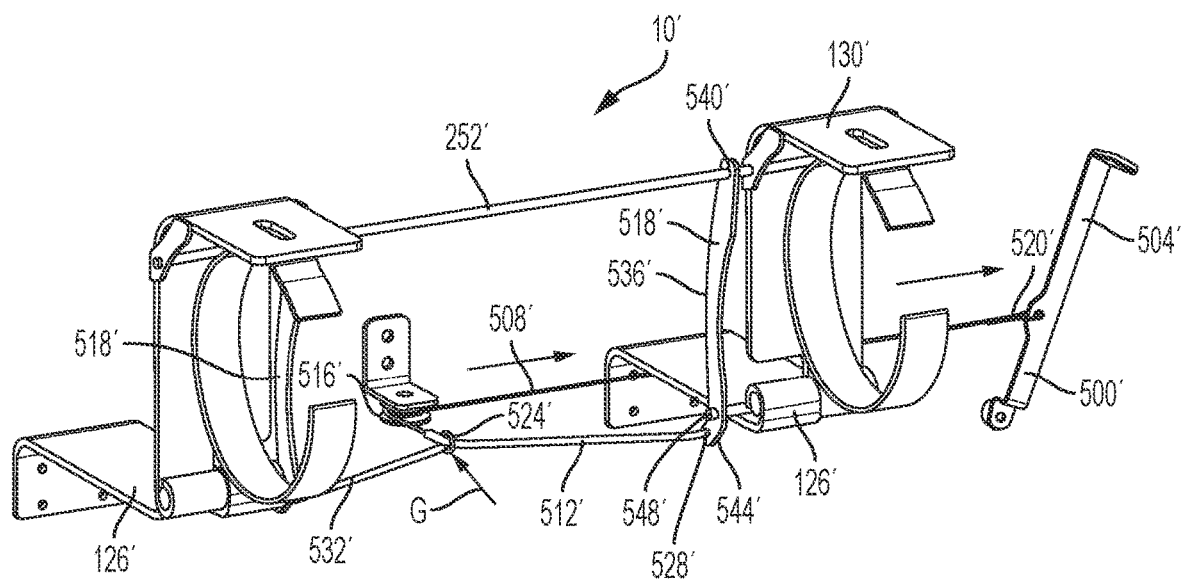
FIG. 13 is a perspective view of the loading assembly of FIG. 12 with the second frame in a deployed position.

FIGS. 12-13 illustrate another implementation of the loading assembly 10'. The loading assembly 10' is substantially similar to the loading assembly 10 illustrated in FIGS. 1-11. As such, only the differences will be discussed herein. All similar features have been given the same reference number with an added prime symbol.

The loading assembly 10' includes a manual actuator assembly 500' configured to move the second frame 130' between the stowed position (see FIG. 12) and the deployed position (see FIG. 13). The manual actuator assembly 500' includes a handle 504' pivotably coupled to the housing 38' and accessible outside the netwrap chamber 98', a primary cable 508', a secondary cable 512', and one or more pulleys 516' to direct the cables 508', 512' during use. The actuator assembly 500' also includes a pair of elongated members 518' pivotably coupled to the first frame 126' and rotatable together with the second frame 130' during use.

The primary cable 508' of the actuator assembly 500' includes a first end 520' coupled to the handle 504', and a second end 524' opposite the first end 520'. In the illustrated implementation, the second end 524' of the primary cable 508' forms a loop.

The secondary cable 512' of the actuator assembly 500' includes a first end 528' coupled to one of the two elongated members 518', and a second end 532' opposite the first end 538' that is coupled to the other of the two elongated member 518'. In the illustrated implementation, the body of the cable 512' extends through the loop formed by the second end 524' of the primary cable 508'.

Each of the elongated members 518' include a body 536' having a first end 540', a second end 544' opposite the first end 540', and a pivot point 548' positioned between the first end 540' and the second end 544'. When assembled, the first end 540' of each elongated member 518' is coupled to the cross-member 252' of the second frame 130' proximate one of the arms 166a', 166b'. Furthermore, the second ends 544' of the elongated members 518' are coupled to the first end 528' and the second end 532' of the secondary cable 512', respectively.

To manually move the second frame 130' from the stowed position to the deployed position, the user grasps the handle 504' and pivots it with respect to the housing 28' of the baler 14'. The pivoting motion of the handle 504', in turn, pulls on the first end 520' of the primary cable 508' which causes the second end 524' of the primary cable 508' to move in the first direction G.

As the second end 524' of the primary cable 508' moves in the first direction G, the looped end pulls on the body of the secondary cable 512' causing the first end 528' and the second end 532' thereof to move inwardly toward one another and also move in the first direction G. This force, is transmitted to the second ends 544' of the elongated members 518' which cause the elongated members to rotate about their corresponding pivot points 548'. This motion, in turn, is transmitted to the second frame 130' which causes the frame 130' to pivot from the stowed position (see FIG. 12) into the deployed position (see FIG. 13).

To return the second frame 130' to the stowed position, the user releases the handle 504', which allows the system to go slack and allows the second frame 130' to pivot back into the stowed position (see FIG. 12).

Referring to the FIGS. 14-20, a baler is generally shown at 620. The baler 620 may alternatively be referred to as a round baler 620. The baler 620 accumulates cut crop material, and forms the accumulated crop material into a round bale. Generally, the baler 620 accumulates the crop material in a bale forming chamber, wherein the baler 620 forms the crop material into the round bale. The manner, process, and/or features used to form the crop material into the round bale in the bale forming chamber are known to those skilled in the art, are not pertinent to the teachings of this disclosure, and are therefore not described in detail herein.

Figure 14:
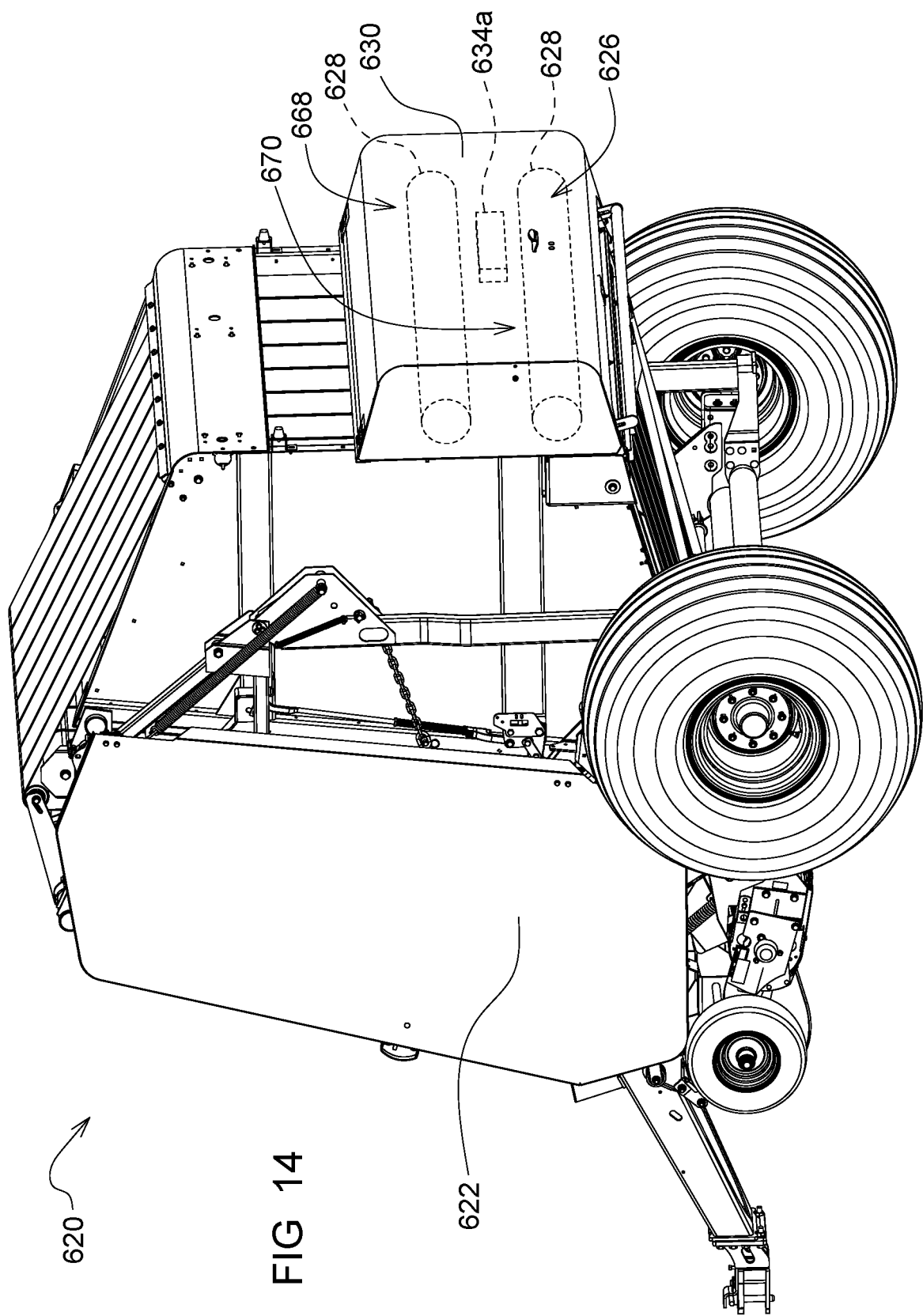
FIG. 14 is a schematic perspective view of a baler showing a cover in a closed position.
Figure 15:
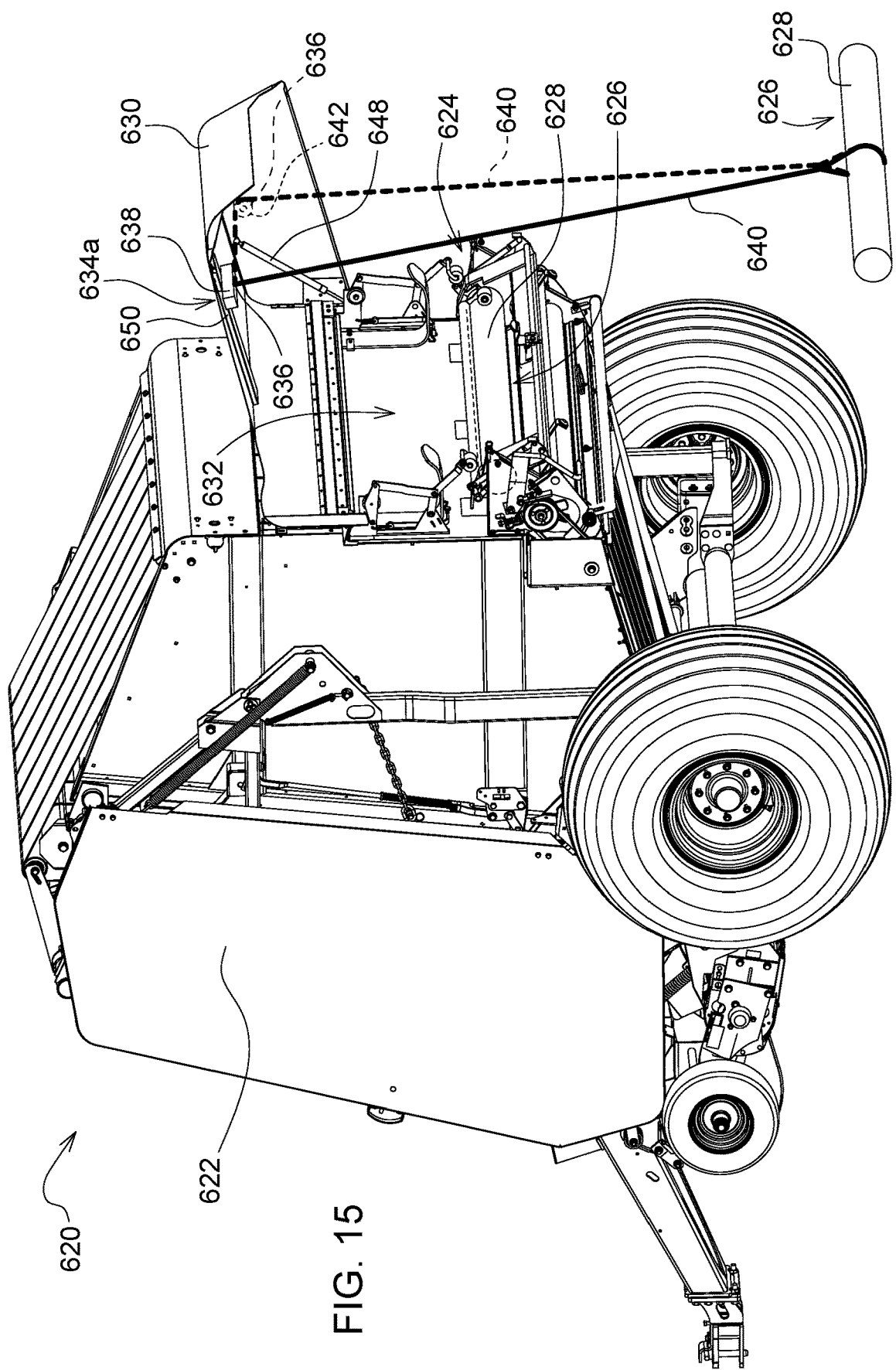
FIG. 15 is a schematic perspective view of the baler showing the cover in an open position and a first embodiment of a lift system.

The baler 620 includes a body 622. The body 622 may include one or more panels that form an exterior surface of the baler 620, as well as the frame and other support members that support the panels and other components of the baler 620. Referring to FIG. 15, the baler 620 includes a wrap system 624 that is attached to the body 622. The wrap system 624 includes a roll 626 of wrap material 628 that is supported relative to the body 622 in an installed position. As shown in FIG. 14, the wrap system 624 may further include a second roll 668 of wrap material 628 that is supported relative to the body 622 in a storage position.

The wrap material 628 includes a width that is substantially equal to, or perhaps slightly larger than, a height of the round bale. The wrap material 628 may include a film, mesh, net, or other material suitable for wrapping around a circumference of the round bale to secure the shape and/or form of the round bale, and/or to protect the round bale from moisture intrusion. For example, the wrap material 628 may include, but is not limited to, a plastic film that is wound around the circumference of the round bale.

The wrap system 624 is configured for wrapping the wrap material 628 around the formed round bale in the bale forming chamber of the baler 620. As such, the wrap system 624 un-winds the wrap material 628 from the roll 626 and feeds the wrap material 628 into the bale forming chamber, where the wrap material 628 is wound around the circumference of the round bale. The specific manner in which the wrap system 624 un-winds the wrap material 628, feeds the wrap material 628 into the bale forming chamber, and wraps the wrap material 628 around the round bale within the bale forming chamber is not pertinent to the teachings of this disclosure, are known to those skilled in the art, and are therefore not described in detail herein.

Referring to FIGS. 14-20, a cover 630 is moveably attached to the body 622. The cover 630 is moveable between a closed position, shown in FIG. 14, and an open position, shown in FIGS. 15 through 20. When the cover 630 is disposed in the open position, the cover 630 provides access to the wrap system 624 from an exterior location of the baler 620. The exterior location may include, for example, a location an operator may stand when loading the roll 626 of wrap material 628 into the wrap system 624, or otherwise servicing the wrap system 624. When the cover 630 is disposed in the closed position, the cover 630 encloses the wrap system 624 from the exterior location. As such, when the cover 630 is in the closed position, the body 622 and the cover 630 cooperate to form a wrap chamber 632 therebetween, wherein the roll 626 of the wrap material 628 is positioned when in the installed position. With the cover 630 in the closed position, the wrap chamber 632 is generally closed or sealed to prevent or limit dust, dirt, debris, and moisture from contacting the wrap system 624, including the roll 626 of wrap material 628.

The exemplary embodiment of the baler 620 includes the cover 630 rotatable about a horizontal axis, such that the cover 630 moves in an upward and/or downward motion relative to the body 622, whereby the cover 630 is positioned vertically above the wrap system 624 when disposed in the open position. However, it should be appreciated that in other embodiments, the cover 630 may rotate about a vertical axis, such that the cover moves in a side-to-side motion, whereby the cover 630 is positioned to a side of the baler 620 when positioned in the open position.

The baler 620 further includes a lift system 634A, 634B. A first embodiment of the lift system is generally shown at 634A in FIGS. 14-16, and a second embodiment of the lift system is generally shown at 634B in FIGS. 17-20. The lift system 634A, 634B is operable to raise the roll 626 of wrap material 628, relative to the body 622, into the installed position. The lift system 634A, 634B is attached to one of the body 622 and the cover 630. When the cover 630 is disposed in the closed position, the lift system 634A, 634B is concealed between the body 622 and the cover 630, within the wrap chamber 632. The lift system 634A, 634B may be accessed by moving the cover 630 into the open position. In the exemplary embodiment shown in the Figures and described herein, when the cover 630 is disposed in the open position, the lift system 634A, 634B is positioned below the cover 630. However, as noted above, if the cover 630 moves to the side when opened, then the lift system 634A, 634B would not be positioned below the cover.

The lift system 634A, 634B includes a lift location 636, or a lift point. The lift location 636 is the location from which a vertical force is applied to one or more components of the baler 620 in order to raise the roll 626 of wrap material 628. When the cover 630 is disposed in the open position, the lift location 636 is positionable at an elevation disposed above the installed position of the roll 626 of wrap material 628. The lift location 636 is located vertically above the installed position of the roll 626 of wrap material 628 so that the roll 626 may be fully lifted into the installed position.

The lift system 634A, 634B may include a line actuator 638 having a line 640. The line 640 extends from the lift location 636 downward for engagement with the roll 626 of wrap material 628. The line 640 may include, but is not limited to, a cable, a rope, a chain, a strap, etc. The line 640 may include or attach to a cradle, sling, or other device for engaging the roll 626 of wrap material 628. The line actuator 638 may include a mechanism capable of retracting and extending the line in order to raise and lower the roll 626 of wrap material 628. For example, the line actuator 638 may include a winding device that is capable of winding and un-winding the line 640 in order to raise and lower the roll 626 of wrap material 628. For example, the line actuator 638 may include, but is not limited to, an electrically driven winch or a manually operated winch that winds and unwinds the line 640 to raise and lower the roll 626. In other embodiments, the line actuator 638 may include a linear actuator that moves the line 640 in a linear manner to raise and lower the roll 626. It should be appreciated that the lift system 634A, 634B may include a device other than the exemplary embodiments of the line actuator 638 described herein for raising the roll 626 of wrap material 628.

Figure 16:
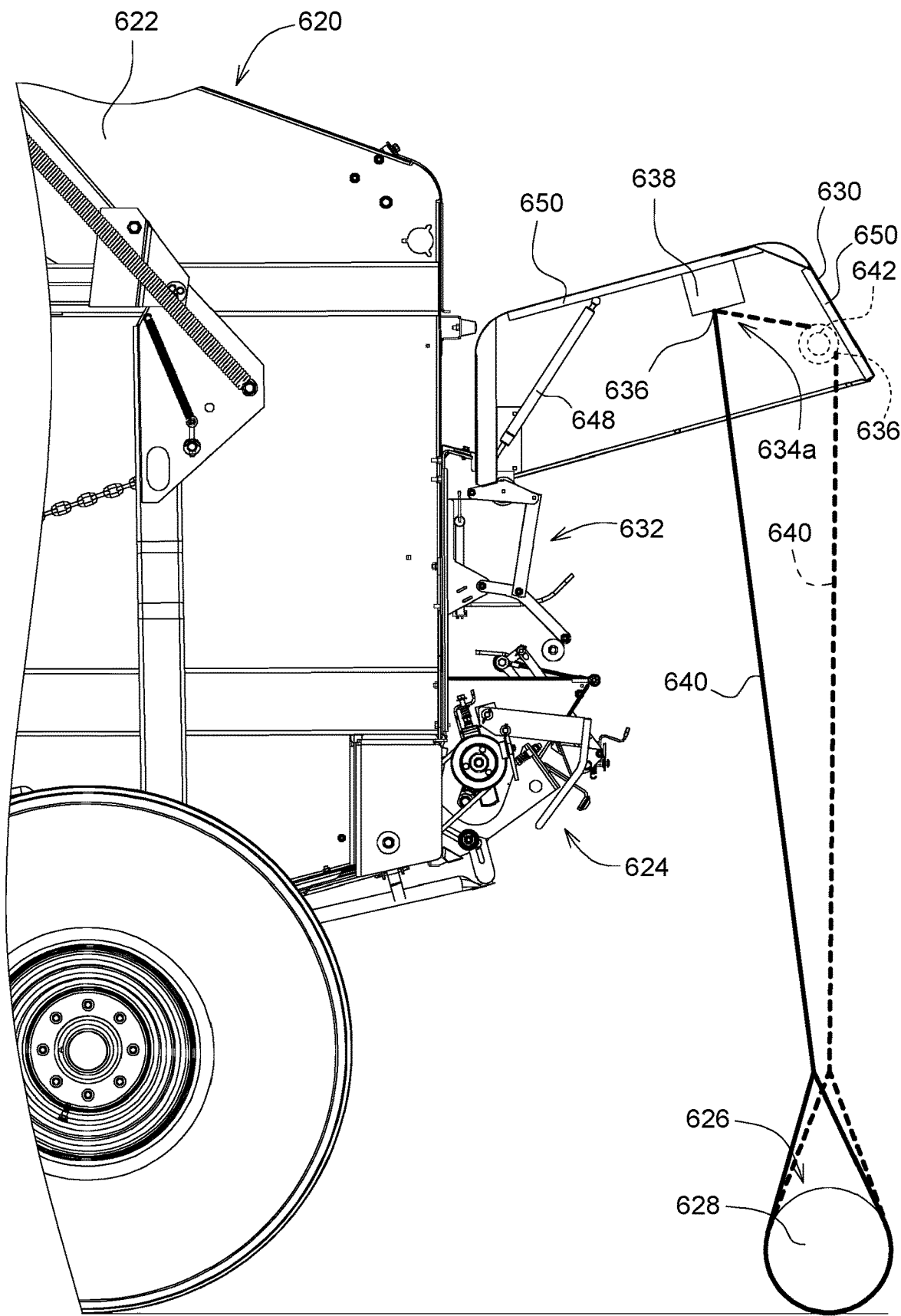
FIG. 16 is a schematic cross-sectional side view of the baler showing the first embodiment of the lift system.

In some embodiments, the lift system 634A, 634B may include a lift structure 642. The lift structure 642 may include a device that is capable of re-directing the path of the line 640. For example, FIGS. 15 and 16 show an arrangement of the lift system 634A in phantom that includes the lift structure 642 attached to the cover 630. The lift structure 642 may include a pulley, or other similar device. In one embodiment, the lift structure 642 may be directly attached to the cover 630 to define the lift location 636, such as shown in Phantom in FIGS. 15 and 16. In other embodiments, the lift structure 642 may be attached to a distal end 644 of a jib 646 to define the lift location 636.

Referring to FIGS. 15-16, the first embodiment of the lift system is generally shown at 634A. FIGS. 15 and 16 show a first arrangement of the lift system 634A in solid lines, in which the line 640 travels directly from the line actuator 638 to the roll 626. As such, the line actuator 638 defines the lift location 636, and not lift structure is used. FIGS. 15 and 16 show an alternative arrangement of the lift system 634A in phantom in which the lift system 634A includes the lift structure 642 embodied as a pully attached to the cover 630. The first arrangement of the lift system 634A shown in solid lines includes the line actuator 638 directly attached to the cover 630 and directly defining the lift location 636. The line actuator 638 may be extended to lower the line 640 for attachment to the roll 626 of wrap material 628 at a lower elevation. Once the line 640 is attached to the roll 626, the line actuator 638 may be retracted, e.g., wound, to raise the roll 626 of wrap material 628 into the installed position in the wrap system 624. The second arrangement of the lift system 634A shown in phantom in FIGS. 15 and 16 includes the line actuator 638 directly attached to the cover 630, and the lift structure 642 embodied as a pully attached to the cover 630. The pulley of the lift structure 642 defines the lift location 636, around which the line 640 is passed to relocate the lift location 636 away from the body 622.

Because the winch is attached to and supported by the cover 630 in the first embodiment shown in FIGS. 14 through 16, the cover 630 must be configured to stay in the open position while raising the roll 626 of wrap material 628, and must be capable of supporting the weight of the roll 626 of wrap material 628 without deformation. Accordingly, the lift system 634A may include a cover support 648. The cover support 648 interconnects the cover 630 and the body 622 when the cover 630 is disposed in the open position, and secures the cover 630 relative to the body 622 while the lift system 634A is raising the roll 626 of wrap material 628. The cover support 648 may include any structure or mechanism that is capable of maintaining the position of the cover 630 in the open position while the cover 630 supports 648 the weight of the roll 626 of wrap material 628. For example, the cover support 648 may include a strut, link, hinge lock, etc., that braces the cover 630 in the open position relative to the body 622.

Additionally, in order to support the weight of the roll 626 of wrap material 628, the cover 630 may include a cover structure 650. The cover structure 650 may include a framework, supports, cross members, bracing, etc., which support and provide strength and rigidity to the cover 630. The cover support 648 and the cover structure 650 are operable to support the cover 630 in the open position against the weight of the roll 626 of wrap material 628 without permanent deformation to the cover 630.

In one embodiment, such as shown in FIGS. 14-16, the line actuator 638 may be directly attached to the cover 630 and/or the cover structure 650, with the line actuator 638 directly defining the lift location 636. In other embodiments, the line actuator 638 may be directly attached to the body 622 (not shown), and the lift structure 642 may be attached to the cover 630 and/or the cover structure 650, such as shown in phantom in FIGS. 15 and 16, to provide the lift location 636. For example, the line actuator 638 may be directly attached to the body 622, and the lift structure 642 may include a pulley that is directly attached to the cover 630 and/or cover structure 650. The lift structure 642, i.e., the pulley, defines the lift location 636, with the line 640 extending around the pulley and downward for engagement with the roll 626 of wrap material 628.

As shown in FIG. 14, when the cover 630 is dispose din the closed position, the line actuator 638 is disposed or positioned within a region 670 that is between the roll 626 of wrap material in the installed position, and the roll 668 of wrap material in the stored position. This arrangement advantageously uses the empty space between the rolls 628, 668 to accommodate the line actuator 638 when the cover is positioned in the closed position.

Referring to FIGS. 17-20. A second embodiment of the lift system is generally shown at 634B. The lift system 634B includes a jib 646. The jib 646 extends from the body 622 to a distal end 644, with the distal end 644 of the jib 646 defining the lift location 636. In one embodiment, the jib 646 is moveable relative to the body 622 between a stowed position, shown in FIG. 17, and an operating position, shown in FIGS. 18-20. When the jib 646 is disposed in the stowed position, the jib 646 is nestled against the body 622 in the center region 670 and out of interference with the cover 630 so that the cover 630 may be positioned in the closed position. When the jib 646 is disposed in the operating position, the jib 646 extends away from the body 622 and presents the lift location 636, i.e., the distal end 644 of the jib 646, in a position for raising the roll 626 of wrap material 628 into the installed position of the wrap system 624.

Figure 17:
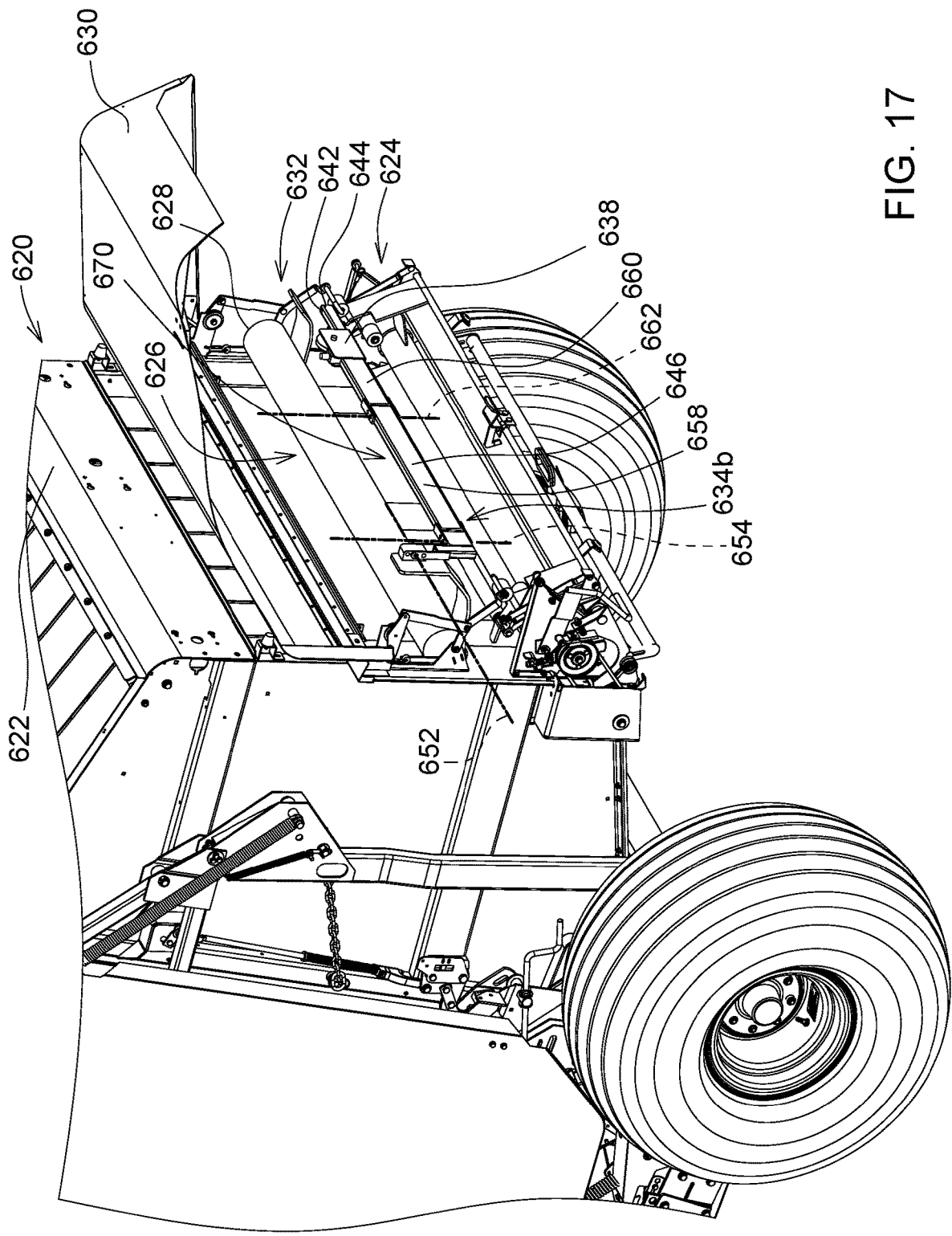
FIG. 17 is a schematic perspective end view of the baler showing a jib of a second embodiment of the lift system in a first elevated position.
Figure 18:
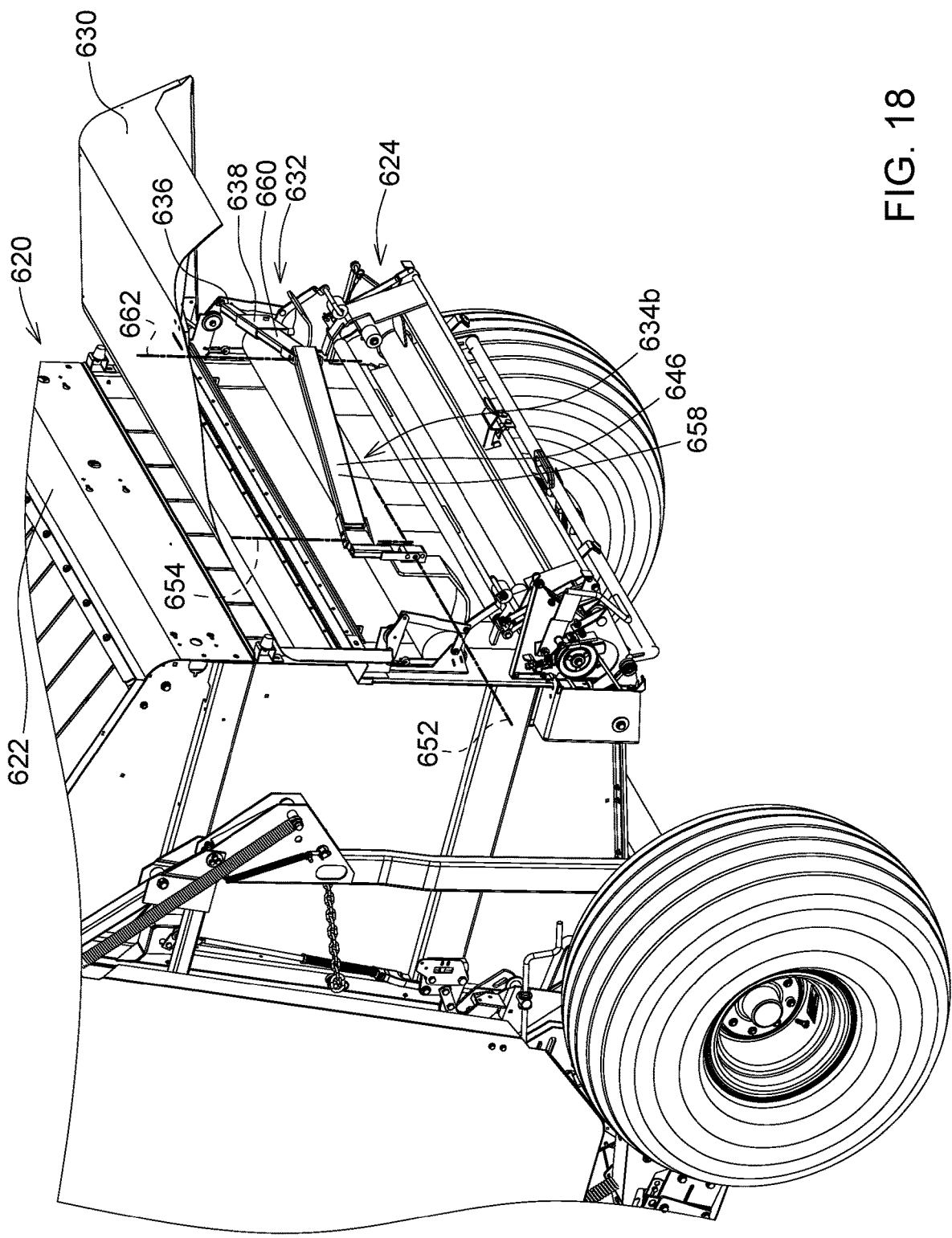
FIG. 18 is a schematic perspective end view of the baler showing the jib of the second embodiment of the lift system in a second elevated position.

In the exemplary embodiment shown in the Figures, the jib 646 is rotatably attached to the body 622 for rotation about a horizontal axis 652 for movement between a first elevated position, shown in FIG. 17, and a second elevated position shown in FIG. 18. The first elevated position may be associated with the stowed position, whereas the second elevated position may be associated with the operating position. As shown in the Figures, the first elevation is lower than the second elevation. Additionally, the second elevated position positions the lift location 636 above the installed position of the roll 626 of wrap material 628. The jib 646 may be rotatably attached to the body 622 in any suitable manner that enables rotation about the horizontal axis 652. Furthermore, it should be appreciated that the jib 646 may be locked or otherwise secured in either the first elevated position or the second elevated position as needed, so that the jib 646 does not rotate about the horizontal axis 652 while raising the roll 626 of wrap material 628 into the installed position, or so that the jib 646 does not move during transport when in the stowed position.

Figure 19:
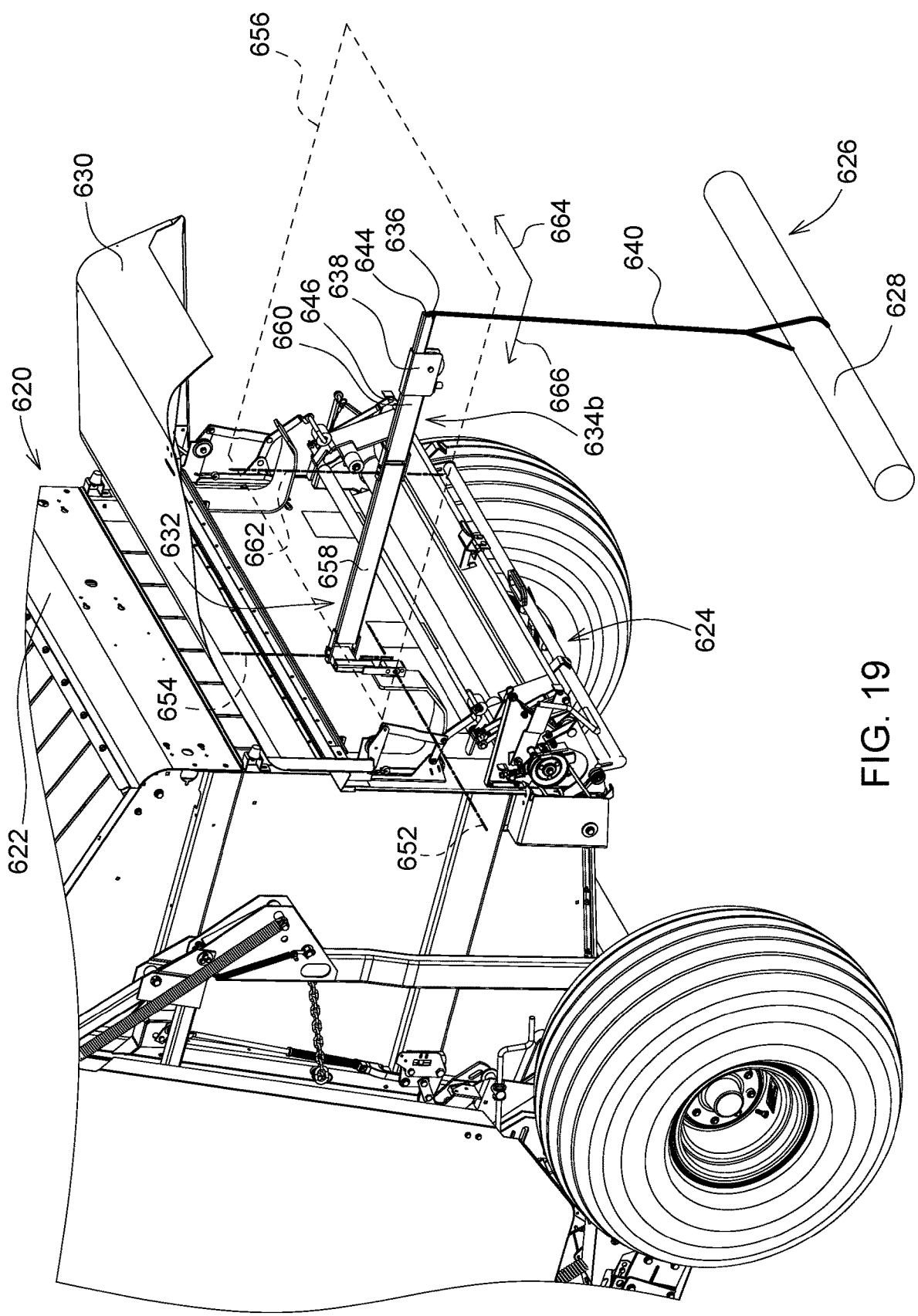
FIG. 19 is a schematic perspective end view of the baler showing the second embodiment of the lift system in an operating position.
Figure 20:
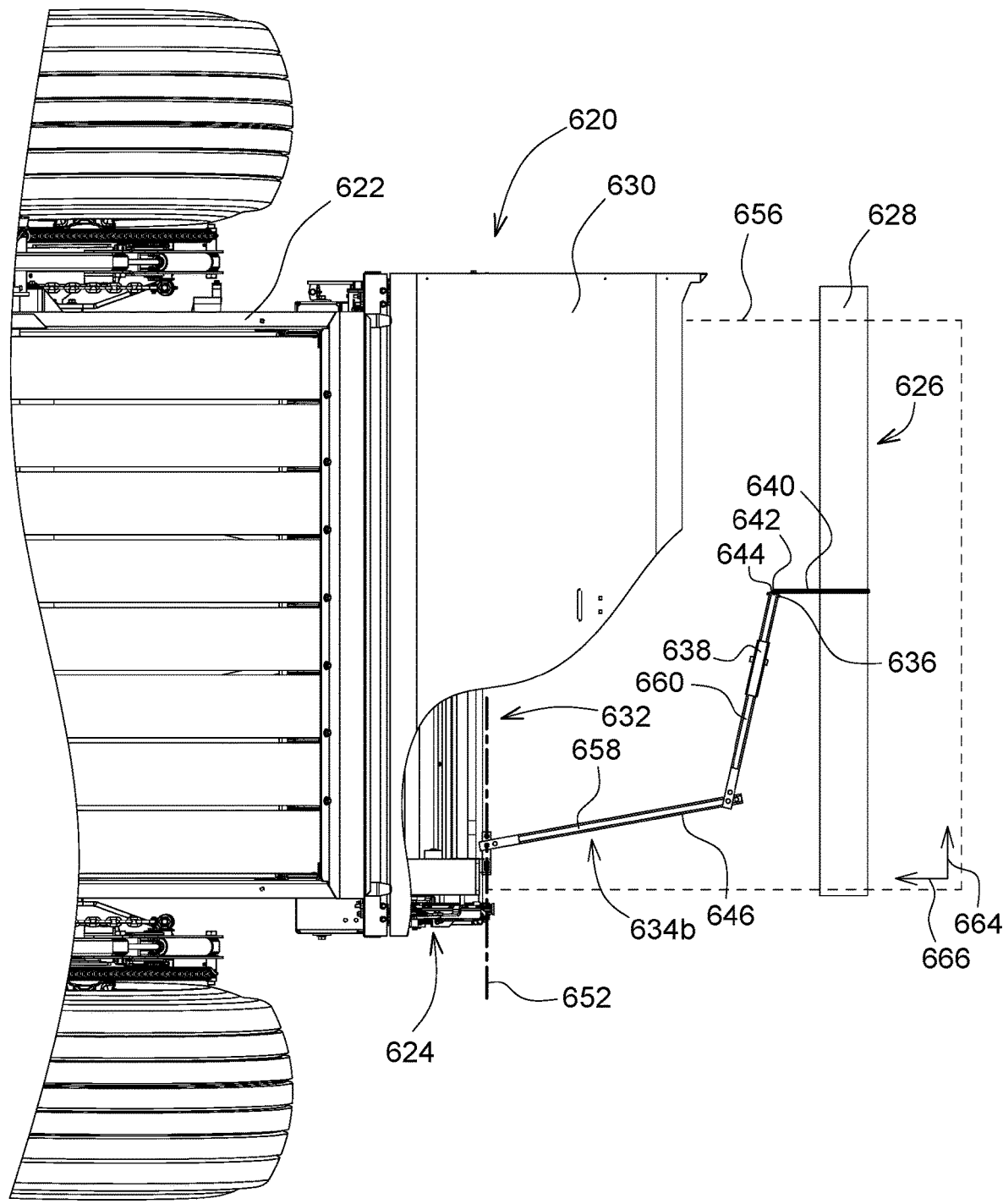
FIG. 20 is a schematic top view of the baler showing the second embodiment of the lift system in the operating position.

The exemplary embodiment of the lift system 634B shown in FIGS. 17-20 and described herein includes jib 646 rotatably attached to the body 622 for rotation about a first vertical axis 654. Referring to FIGS. 19-20, the jib 646 rotates about the first vertical axis 654, on a substantially horizontal plane 656, defined by an x axis 664 and a y axis 666 relative to the ground surface. More specifically, the jib 646 includes a first member 658 and a second member 660. The first member 658 is attached to the body 622 for rotation about the first vertical axis 654 on the substantially horizontal plane 656. The second member 660 is rotatably attached to the first member 658 for rotation about a second vertical axis 662. The first vertical axis 654 and the second vertical axis 662 are parallel with each other. The second member 660 rotates about the second vertical axis 662 relative to the first member 658 and on the substantially horizontal plane 656 with the first member 658. The second member 660 includes the distal end 644 of the jib 646, which defines the lift location 636.

With the jib 646 disposed in the second elevated position, the first member 658 and the second member 660 of the jib 646 may rotate about the first vertical axis 654 and the second vertical axis 662 respectively, to position the lift location 636 over a wide range of locations. By so doing, the lift location 636 may be easily positioned directly over the roll 626 of wrap material 628, raised to the proper elevation, and then swung over into the wrap system 624 and into the installed position. As shown in the Exemplary embodiment, the line actuator 638 is attached to the second member 660 of the jib 646, and the lift structure 642 is attached to the distal end 644 of the jib 646, i.e., the distal end 644 of the second member 660, to define the lift location 636.

The exemplary embodiment of the baler shown in the Figures and described herein shows the wrap system 624 and the lift system 634A, 634B located at the rearward end of the baler 620. However, it should be appreciated that the teachings of this disclosure may be applied to embodiments of the baler in which the wrap system, the lift system and the cover are located at the forward end of the baler.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A baler for accumulating cut crop material and forming the crop material into a round bale, the baler comprising:
   a body;
   a wrap system attached to the body and operable to support a roll of wrap material in an installed position;
   a lift system attached to the body and operable to raise the roll of wrap material, relative to the body, into the installed position;
   wherein the lift system includes:
      a jib rotatably attached to the body for rotation about a first vertical axis on a substantially horizontal plane relative to a ground surface; and
      a line actuator attached to the jib, wherein the line actuator includes a line, and is operable to retract and extend the line for raising and lowering the roll of wrap material;
      a cover attached to the body and moveable between an open position providing access to the wrap system from an exterior location, and a closed position enclosing the wrap system from the exterior location; and
      wherein the lift system is concealed between the body and the cover when the cover is disposed in the closed position, and wherein the lift system is operable to raise the roll of wrap material, relative to the body, into the installed position.

2. The baler set forth in claim 1, wherein the jib extends from the body to a distal end, with the distal end of the jib defining a lift location positionable at an elevation disposed above the installed position of the roll of wrap material.

3. The baler set forth in claim 1, wherein the lift system is positioned below the cover when the cover is disposed in the open position.

4. The baler set forth in claim 1, wherein the line actuator is one of an electrically driven winch or a manually operated winch.

5. A baler for accumulating cut crop material and forming the crop material into a round bale, the baler comprising:
   a body;
   a wrap system attached to the body and operable to support a roll of wrap material in an installed position;
   a lift system attached to the body and operable to raise the roll of wrap material, relative to the body, into the installed position;
   wherein the lift system includes:
      a jib rotatably attached to the body for rotation about a first vertical axis on a substantially horizontal plane relative to a ground surface;
      a line actuator attached to the jib, wherein the line actuator includes a line, and is operable to retract and extend the line for raising and lowering the roll of wrap material;
      wherein the jib extends from the body to a distal end, with the distal end of the jib defining a lift location positionable at an elevation disposed above the installed position of the roll of wrap material; and wherein the jib includes a first member attached to the body for rotation about the first vertical axis on the substantially horizontal plane, and a second member rotatably attached to the first member for rotation about a second vertical axis on the substantially horizontal plane, with the second member defining the distal end of the jib, and including the line actuator.

6. The baler set forth in claim 5, further comprising:
a cover attached to the body and moveable between an open position providing access to the wrap system from an exterior location, and a closed position enclosing the wrap system from the exterior location; and
wherein the jib is moveable relative to the body between a stowed position with the jib nestled against the body and out of interference with the cover when the cover is disposed in the closed position, and an operating position with the jib extending away from the body for presenting the lift location in a position for raising the roll of wrap material.

7. A baler for accumulating cut crop material and forming the crop material into a round bale, the baler comprising:
a body;
a wrap system attached to the body and operable to support a roll of wrap material in an installed position;
a lift system attached to the body and operable to raise the roll of wrap material, relative to the body, into the installed position;
wherein the lift system includes:
a jib rotatably attached to the body for rotation about a first vertical axis on a substantially horizontal plane relative to a ground surface;
a line actuator attached to the jib, wherein the line actuator includes a line, and is operable to retract and extend the line for raising and lowering the roll of wrap material; and
wherein the jib is rotatably attached to the body for rotation about a horizontal axis for movement between a first elevated position and a second elevated position.

8. The baler set forth in claim 7, wherein the wrap system is operable to support a second roll of wrap material in a storage position, and wherein the jib is at least partially disposed in a region positioned vertically between the roll of wrap material in the installed position and the second roll of wrap material in the storage position when the jib is disposed in the first elevated position.

9. A baler for accumulating cut crop material and forming the crop material into a round bale, the baler comprising:
a body;
a wrap system attached to the body and operable to support a roll of wrap material in an installed position, and a second roll of wrap material in a storage position;
a lift system attached to the body and operable to raise the roll of wrap material, relative to the body, into the installed position;
wherein the lift system includes:
a jib rotatably attached to the body for rotation on a substantially horizontal plane relative to a ground surface about a first vertical axis;
a line actuator attached to the jib, wherein the line actuator includes a line, and is operable to retract and extend the line for raising and lowering the roll of wrap material;
wherein the jib is rotatably attached to the body for rotation about a horizontal axis for movement between a first elevated position and a second elevated position; and
wherein the jib is at least partially disposed in a region positioned vertically between the roll of wrap material in the installed position and the second roll of wrap material in the storage position when the jib is disposed in the first elevated position.

10. The baler set forth in claim 9, wherein the jib is positioned at an elevation disposed above the second roll of wrap material in the storage position when the jib is disposed in the second elevated position.

11. The baler set forth in claim 9, wherein the jib extends from the body to a distal end, with the distal end of the jib defining a lift location positionable at an elevation disposed above the installed position of the roll of wrap material.

12. The baler set forth in claim 11, wherein the jib includes a first member attached to the body for rotation on the substantially horizontal plane about the first vertical axis, and a second member rotatably attached to the first member for rotation on the substantially horizontal plane about a second vertical axis, with the second member defining the distal end of the jib, and including the line actuator.

13. The baler set forth in claim 9, further comprising a cover attached to the body and moveable between an open position providing access to the wrap system from an exterior location, and a closed position enclosing the wrap system from the exterior location.

14. The baler set forth in claim 13, wherein the lift system is concealed between the body and the cover when the cover is disposed in the closed position, and wherein the lift system is operable to raise the roll of wrap material, relative to the body, into the installed position.

15. The baler set forth in claim 13, wherein the lift system is positioned below the cover when the cover is disposed in the open position.

16. The baler set forth in claim 9, wherein the line actuator is one of an electrically driven winch or a manually operated winch.

17. The baler set forth in claim 9, further comprising:
a cover attached to the body and moveable between an open position providing access to the wrap system from an exterior location, and a closed position enclosing the wrap system from the exterior location; and
wherein the jib is moveable relative to the body between a stowed position with the jib nestled against the body and out of interference with the cover when the cover is disposed in the closed position, and an operating position with the jib extending away from the body for presenting the lift location in a position for raising the roll of wrap material.

* * * * *